(12) United States Patent
Houston

(10) Patent No.: US 8,181,194 B2
(45) Date of Patent: May 15, 2012

(54) COOPERATIVE SYSTEM FOR MEASURING ELECTRONIC MEDIA

(75) Inventor: John S. Houston, New York, NY (US)

(73) Assignee: The Nielsen Company (US), LLC, Schaumburg, IL (US)

( * ) Notice: Subject to any disclaimer, the term of this patent is extended or adjusted under 35 U.S.C. 154(b) by 1842 days.

(21) Appl. No.: 10/026,872

(22) Filed: Dec. 21, 2001

(65) Prior Publication Data

US 2002/0056089 A1    May 9, 2002

Related U.S. Application Data

(63) Continuation of application No. 08/880,371, filed on Jun. 23, 1997, now Pat. No. 6,353,929.

(51) Int. Cl.
*H04N 7/173* (2011.01)
*H04N 5/445* (2011.01)
*G06F 9/44* (2006.01)
*G06F 13/00* (2006.01)
*H04N 7/16* (2011.01)

(52) U.S. Cl. ............... 725/14; 725/9; 725/46; 719/329; 715/745

(58) Field of Classification Search .............. 719/238, 719/329, 328; 724/46; 725/9, 10, 14, 46; 717/147; 715/745, 747
See application file for complete search history.

(56) References Cited

U.S. PATENT DOCUMENTS

| | | | |
|---|---|---|---|
| 4,025,851 A * | 5/1977 | Haselwood et al. | 725/22 |
| 5,374,951 A * | 12/1994 | Welsh | 725/20 |
| 5,410,344 A | 4/1995 | Graves et al. | |
| 5,481,294 A | 1/1996 | Thomas et al. | |
| 5,612,898 A * | 3/1997 | Huckins | 709/224 |
| 5,636,292 A | 6/1997 | Rhoads | |
| 5,680,323 A | 10/1997 | Barnard | |
| 5,727,129 A | 3/1998 | Barret et al. | |
| 5,758,257 A | 5/1998 | Herz et al. | |

(Continued)

FOREIGN PATENT DOCUMENTS

WO    WO 96/41495    12/1996

(Continued)

OTHER PUBLICATIONS

Advanced Television System Committee (ATSC), Program Guide for Digital Television (Jan. 3, 1996).

(Continued)

*Primary Examiner* — Pankaj Kumar
*Assistant Examiner* — Reuben M Brown
(74) *Attorney, Agent, or Firm* — Hanley, Flight & Zimmerman, LLC

(57) ABSTRACT

A media measurement system uses media handlers to obtain information from presented media for collection by research data collection agents and dispatch to a controller. The controller registers media for measurement. One or more research data collection agents are assigned to measure each panel member's exposure to and interactions with media. A research data collection agent tracks a panel member and collects transmissions from the cooperative media handlers. The research data collection agent creates log entry objects from transmissions received from the cooperative media handlers, places the log entry objects into an unfiltered media queue, confirms the integrity of the messages, filters out unnecessary log entry objects from the unfiltered media queue to create a filtered media queue, creates dispatch objects using objects from the filtered media queue, places dispatch objects into a dispatch queue, and transmits dispatch objects from the dispatch queue to the controller.

98 Claims, 23 Drawing Sheets

U.S. PATENT DOCUMENTS

| | | | |
|---|---|---|---|
| 5,768,680 | A | 6/1998 | Thomas |
| 5,796,952 | A | 8/1998 | Davis et al. |
| 5,872,588 | A | 2/1999 | Aras et al. |
| 5,878,384 | A | 3/1999 | Johnson et al. |
| 5,892,900 | A | 4/1999 | Ginter et al. |
| 5,915,019 | A | 6/1999 | Ginter et al. |
| 5,918,012 | A * | 6/1999 | Astiz et al. ............... 709/217 |
| 5,920,700 | A | 7/1999 | Gordon et al. |
| 5,920,861 | A | 7/1999 | Hall et al. |
| 5,943,422 | A | 8/1999 | Van Wie et al. |
| 5,964,839 | A | 10/1999 | Johnson et al. |
| 5,987,611 | A | 11/1999 | Freund |
| 6,006,279 | A | 12/1999 | Hayes |
| 6,108,637 | A | 8/2000 | Blumenau |
| 6,330,593 | B1 * | 12/2001 | Roberts et al. ............ 709/217 |
| 6,449,653 | B2 * | 9/2002 | Klemets et al. ............ 709/231 |
| 7,043,526 | B1 | 5/2006 | Wolfe |
| 7,155,451 | B1 * | 12/2006 | Torres ................... 707/104.1 |
| 7,634,772 | B2 * | 12/2009 | Parthasarathy et al. ....... 717/178 |
| 2003/0110485 | A1 * | 6/2003 | Lu et al. ..................... 725/9 |
| 2004/0078292 | A1 * | 4/2004 | Blumenau ................... 705/27 |

FOREIGN PATENT DOCUMENTS

| | | |
|---|---|---|
| WO | 97/15007 A1 | 4/1997 |
| WO | WO 97/15007 | 4/1997 |
| WO | 97/26729 A2 | 7/1997 |
| WO | 98/26571 A2 | 6/1998 |
| WO | WO 98/26571 | 6/1998 |
| WO | WO 98/31155 | 7/1998 |

OTHER PUBLICATIONS

Advanced Television System Committee (ATSC), Program/Episode/Version Identification Standard, Doc. A/57 (Aug. 30, 1996).

T. Berners-Lee, "Hypertext Transfer Protocol—HTTP/1.0," pp. 15-20, 46 (1996).

L.F. Cooper, "More Than Just Hits," Information Week, No. 608, pp. 63, 68, 72 (Dec. 2, 1996).

M.K. Franklin et al., "Auditable Metering with Lightweight Security," Proc. of Financial Cryptography First International Conf., FC '97; 151-160 (Feb. 24, 1997).

S. Franklin et al., "Is it an Agent, or Just a Program?: A Taxonomy for Autonomous Agents," Proc. of the Third International Workshop on Agent Theories, Architectures and Languages (1996).

J. Miller et al., "PICS Rating Services and Rating Systems (and Their Machine Readable Descriptions)," (W3C Recommendation, Oct. 31, 1996).

T. Monk, "Internet Data Acquisition and Analysis: Status and Next Steps," Univ. of California at San Diego, Nat'l Laboratory for Applied Network Research (Mar. 21, 1997).

T. Monk et al., "Cooperation in Iternet Data Acquisition and Analysis," Coordination and Administration of Internet, Cambridge, MA (Sep. 8, 1996).

V. Paxson, "Towards a Framework for Defining Internet Performance Metrics," Lawrence Berkely National Laboratory, Network Research Group (Apr. 18, 1996).

C.J. Petrie, "Agent-Based Engineering, the Web and Intelligence," IEEE Expert (Dec. 1996).

PICS Label Distribution Label Syntax and Communications Protocols, Version 1.1, W3C Recommendation (Oct. 31, 1996).

C.P. Taylor, "Web Tracking Battle Escalates," Interactive Week (Feb. 24, 1997).

H-P Weidling, "HOTJAVA—EIN WWW-Browser Fuer Nachladbare Objekte," Objektspectrum, No. 5, 68-69 (Sep. 1995).

Matthew K. Franklin and Dahlia Malkhi, Auditable Metering with Lightweight Security, Feb. 24, 1997, 10 pages.

Lane F. Cooper, More Than Just Hits—A new generation of Web metrics could lure major advert spend big bucks in cyberspace, Dec. 2, 1996, 3 pages.

Hans Peter Wiedling, Hot Java-Ein WWW-Browser fur nachladvare Objekte, Sep. 1995, 2 pages.

European Patent Office, Examination Report Issued for Application No. EP 98 932 785.3-1238, Jan. 5, 2007, 5 pages.

Office Action, issued by the United States Patent and Trademark Office on Aug. 19, 2009, in connection with U.S. Appl. No. 10/283,953, 15 pages.

European Office Action, issued by the European Patent Office in connection with European Application No. 98932785.3-2221, on Feb. 2, 2010, 4 pages.

Office Action issued by the United States Patent and Trademark Office in connection with U.S. Appl. No. 10/283,953, on Apr. 5, 2011, 14 pages.

* cited by examiner

FIG. 5: PANEL MEMBER DATABASE TABLE

| | 540 | 545 | 550 | 555 | 560 | 565 | 570 | 575 | 580 | 585 |
|---|---|---|---|---|---|---|---|---|---|---|
| | Panel Member ID | Name | Sex | Age | City | State | Education | Income | Primary RDC Agent | Email Address |
| 505 | 37121 | Jason Green | M | 36 | New York | NY | College Grad | $120,000.00 | RDCA50101 | jg121@aol.com |
| 510 | 37122 | Jessica Green | F | 35 | New York | NY | Post Grad | $80,000.00 | RDCA50101 | jessica21@aol.com |
| 515 | 37123 | Jasper Green | M | 8 | New York | NY | Primary | $ -- | RDCA50101 | terak@aol.com |
| 520 | 41023 | Mark Hillerman | M | 28 | Burlington | VT | College Grad | $57,000.00 | RDCA52777 | markhill@msn.com |

FIG. 6: REGISTERED MEDIA DATABASE TABLE

| | Media ID ($M_1$) | Registrant | Agency | Media Type | ID Tag ($C_2$) | Start Date | End Date |
|---|---|---|---|---|---|---|---|
| 605 | 123456 | MSNBC | NBC | MPEG-2 | 1110...1101 | 2/1/01 | 3/1/01 |
| 610 | 123457 | Starwave | Starwave | Java Applet | 1010...1011 | 2/14/01 | 2/28/01 |
| 615 | 123458 | AT&T Universal Card | McCann-Erickson | PNG File | 1111...0101 | 7/7/01 | 7/31/01 |
| 620 | 144231 | IBM | Ogilvy & Mather | Acrobat File | 0001...1000 | 12/15/01 | 12/31/01 |

640 645 650 655 660 665 670

Encryption Keys Database Table

| Key Pair ID | Key Pair Owner | Public Key | Private Key |
|---|---|---|---|
| K1001 | RDCA50101 | 1011...1001 | 0101...1101 |
| K1002 | RDCA50102 | 0001...1101 | 1111...0010 |
| K1003 | MRC0001 | 1010...1100 | 1011...0001 |
| K10044 | RDCA50159 | 1011...1101 | 1100...0110 |

FIG. 7

FIG. 8: LOG ENTRY DATABASE TABLE

| | 830 | 835 | 840 | 842 | 845 | 850 | 855 | 860 |
|---|---|---|---|---|---|---|---|---|
| | Entry ID | RDC Agent ID | Media Handler ID | Media Handler Host ID | Registered Media ID | Panel Member IDs | Date | Time |
| 805 | 123456 | RDCA73211 | MH73211 | MHH2112 | 123456 | 41023,21121 | 07/07/2001 | 14:02:00 |
| 810 | 123457 | RDCA74123 | MH12111 | MHH4123 | 0 | 24101 | 07/07/2001 | 14:02:01 |
| 815 | 123458 | RDCA71212 | MH17312 | MHH1675 | 0 | 41511 | 07/07/2001 | 14:02:01 |
| 820 | 144231 | RDCA41411 | MH15111 | MHH5121 | 312117 | 16211 | 10/30/2001 | 7:12:15 |

865 — Metadata / 870 — Contextual Information

| | Metadata | | Contextual Information | | 875 — Presentation Information | | |
|---|---|---|---|---|---|---|---|
| | Program | Media Type | URL | Source | Language | Format | |
| 805 | none | HTML Page | www.cnn.com/finance/ | 12.31.14.12 | English | B/W | |
| 810 | none | HTML Page | www.news.com | 233.11.21.11 | English | B/W | |
| 815 | Seinfeld | HDTV | none | CBS-HDTV | Spanish | HDTV | |
| 820 | none | MPEG-2 | www.starwars.com | 12.41.22.121 | English | PIP | |

880 — User Interactions

| | User Interactions | | | |
|---|---|---|---|---|
| | Zoom | Rotate | Size | User Input |
| 805 | no | no | large | none |
| 810 | yes | no | medium | none |
| 815 | no | no | full screen | none |
| 820 | no | no | letterbox | none |

Local Panel Member Database Table

| Panel Member ID Number (940) | Panel Member Tracking Semaphore (945) |
|---|---|
| 12312 | In Scope |
| 32311 | Out of Scope |
| 12322 | Out of Scope |

FIG. 9

Local Encryption Keys Database Table

| Local Key ID | Local Pair ID | Key |
|---|---|---|
| K1 | K102212 | 0101...1110 |
| K2 | K102322 | 1100...0011 |
| K3 | K104332 | 0111...0000 |
| K4 | K103221 | 1100...1000 |

FIG. 10

COOPERATIVE SYSTEM FOR MEASURING ELECTRONIC MEDIA

CROSS-REFERENCE TO RELATED APPLICATIONS

This application is a continuation of U.S. patent application Ser. No. 08/880,371, filed Jun. 23, 1997 now U.S. Pat. No. 6,353,929, incorporated by reference herein.

FIELD OF THE INVENTION

The present invention relates generally to a system for measuring a population's exposure to and interactions with electronic media (hereinafter, "electronic media measurement systems"), and more particularly, to a cooperative electronic media measurement system using media handlers to extract information from, or otherwise obtain information about, presented media objects, including identification tags, if present, for collection by software agents on behalf of a centralized media research facility.

BACKGROUND OF THE INVENTION

The success of any advertising campaign depends on the accurate placement of advertisements within media, and the verification that specific advertising messages were presented in accord with a predefined media plan. Generally, an advertising campaign is targeted for one or more segments of a population, with media planners determining the best media vehicles to reach the target audience. In this manner, the advertiser seeks to find the most efficient media to minimize the cost to deliver a desired audience.

Thus, prior to executing a given advertising campaign, media planners use syndicated research, such as Nielsen ratings, to determine the best media vehicles to reach a target audience. In addition, media planners utilize other information sources to research and compare the costs associated with reaching an audience through each available media vehicle. During a given advertising campaign, it is helpful to measure the target audience's exposure to the advertising messages, since media planners might make corrections in order to optimize the execution of the media plan. Likewise, after a given advertising campaign, media planners often analyze the execution of the campaign to confirm that the advertising messages reached the targeted audience to determine the accuracy of the campaign's messages in reaching the targeted audience.

As audiences have fragmented, due to the increasing number of available channels and online options, it has become increasingly challenging for media planners to determine which media vehicles provide the best avenue to a given audience. The Internet, in particular, provides advertisers with many media options and is becoming ubiquitously available in an expanding variety of personal electronic devices, far beyond its initial limited availability to users via computer terminals and desktop computers. As with other media, advertising has become an important part of Internet revenue models. Much of the Internet's value to the advertising community is due to its enormous and evolving diversity of advertising formats, including the banner ad and Java applets, and its capability to deliver customized and relevant advertising to end users. For a more detailed discussion of advertising media, see D. Jugenheimer et al., Advertising Media Strategy and Tactics (W.C.B. Brown & Benchmark, 1992), incorporated by reference herein.

Thus, the Internet provides an efficient mechanism for matching the advertising message to the appropriate segment of the audience. Such diverse advertising formats, however, present challenges for measuring a population's exposure to and interactions with such advertisements. While the success of the Internet can be attributed, in large part, to its open media standards that permit the creation and delivery of content having diverse formats across many platforms, there is currently no user-centric system capable of adequately measuring the diverse media formats across the growing variety of Internet-enabled consumer platforms, consistent with the needs of the advertising community.

Generally, a given population's exposure to and interactions with media is measured by knowing the television channels and other information sources that the members of the population select. This can be performed either as a census, where the choices of the entire population are collected, or as a sample, where a statistically valid sub-population or panel is chosen to represent the entire population. Nielsen Media Research, for example, uses a panel of households, known as "Nielsen Families," for measuring television viewing. Such panels enable research companies to correlate demographics, such as age, gender, income and education, with choice of content.

Conventional content frequently contains, or is associated with, metadata that provides information about the content. For example, many broadcasters transmit information with conventional programming to help identify the content, for example, by program and episode. Nielsen, for example, extracts such accompanying information for measurement purposes to track the programs viewed by certain members of a panel. In addition, smart electronic program guides use such accompanying information to help individuals or their agents find content of interest.

Similarly, the World Wide Web Consortium (W3C), has endorsed the Platform for Internet Content Selection (PICS), which is an open standard for tagging information and coding content on the Internet. The PICS standard is designed to allow software to automatically filter content that individuals choose not to receive, such as violent content, according to a ratings system. The PICS standard provides parents and other individuals with the ability to select categories of content that can be automatically blocked, in a similar manner to V-chip technology, for conventional programming. While the PICS standard allows an entire web site or static pages to be rated, the PICS standard does not permit tagging content on an object level.

In addition, traditional electronic advertising, such as television and radio advertisements, have unique identification codes, or Industry Standard Commercial Identification (ISCI) codes, which are used for handling, broadcasting, storing and retrieving commercials. Under the ISCI standard, an ISCI alpha prefix and an ISCI numeric code identify each commercial. An ISCI prefix is assigned by ISCI to national and regional advertisers and advertising agencies. The ISCI code may be used in any manner, at the discretion of the prefix owner, provided the code consists of four letters followed by four numbers. Although ISCI codes are not presently encoded as computer readable data with each advertisement, they might evolve to do so for Internet advertising, to better manage advertising on the Internet.

There exists both "pull" and "push" models for delivering Internet content. On traditional web sites, individuals "pull" content by browsing. These web sites can use tools to analyze the "hits" to their sites in real-time. Additionally, there exist "push" models of content delivery, such as provided by Point-Cast™. PointCast™ is a webcasting service that "pushes" or streams a variety of information, including editorial and advertising content, to a receiving software component, such as their proprietary screensaver, or Microsoft's Internet Explorer browser, version 4.0. Presently, each PointCast™ subscriber self-reports demographic information. Therefore, PointCast™ can provide advertisers with user-centric information about advertising exposure. Self-monitoring, however, is contrary to advertising industry guidelines, which express a preference for measurement by a disinterested third party. In addition, the PointCast™ system is limited to measuring only electronic media distributed by PointCast™.

Even assuming that an independent auditor verified such site-centric measurements, the measurements often do not accurately reflect the activity of individuals. For example, many of the "hits" on a web site are associated with electronic agents that perform functions on the Internet on behalf of individuals. Examples of such electronic agents include web robots, issued by search engines such as those provided by Infoseek Corp. to index the contents of the Internet, and personal agents that automatically retrieve information from the Internet that matches the specified preferences of an individual. Thus, such electronic agents increase the traffic count of the respective web site, as they are not necessarily representative of an individual viewing Internet content. For example, an agent might download the entire contents of a site, while the user only views a single article. Proxy servers, on the other hand, which cache or copy Internet content to a local server or hard disk drive for subsequent access, can decrease the traffic count of a given web site. Proxy servers are used to reduce access time by storing a copy of information that was recently downloaded from a site. Thus, upon a subsequent request, the information can be delivered from the local server rather than the Internet without the knowledge of the web site traffic counter.

While conventional electronic media measurement systems, such as Nielsen Media Research's PeopleMeter™, have successfully measured traditional media, such as television and radio, such systems are not easily extendable to the Internet environment. In addition, the site-centric measurement approaches discussed above have proven unsatisfactory. In order to accurately measure a population's exposure to and interactions with such electronic media, a user-centric measurement approach is needed which is based on a panel chosen to be statistically representative of the total population of interest. Current user-centric Internet measurement systems, however, such as the NPD Group's PC Meter™, are based on interception and interpretation of electronic media presented to members of a panel. Such interception techniques, however, rely on observing calls by software applications to the operating system and require privileged access into operating system internals. Furthermore, PC Meter™ is currently limited to household users of the Windows™ operating system, which may not be statistically representative of the total population of interest. For a more detailed discussion of the PC Meter™ system, see PCT Published Application Number WO 96/41495.

It is believed that observing operating system internals will become increasingly challenging, if not impossible, with the trend towards more secure operating systems and communication security. Windows NT™ from Microsoft™, for example, implements a concentric ring structure of ascending privilege with an outermost ring of lowest privilege and an innermost ring of highest privilege, from which applications are excluded, based on the processor ring architecture specified by Intel Corporation. As security services become more available to Internet applications, both for computer-to-computer communications and application-to-application communications, much of this internal traffic will be encrypted. In addition, such operating system monitoring techniques will be challenging to implement within the many proprietary implementations of Internet-enabled devices, such as WebTV™. Even assuming that such user-centric measurement systems are successful in obtaining access to these communications, it is very challenging to understand what the intercepted messages mean.

A recent industry article indicates that a new company, Relevant Knowledge Inc., of Atlanta, Ga., has developed a real-time approach to compete with the PC Meter™ system. Although Relevant Knowledge Inc. did not comment publicly for the article, it does not appear that Relevant Knowledge Inc. is using a cooperative approach. Rather, it appears that Relevant Knowledge Inc. is monitoring information, using interception and interpretation, and leveraging the communication capabilities of the Internet to distribute their monitoring software to their panel members and to collect data in real-time.

As apparent from the above-described deficiencies with conventional electronic media measurement systems, a need exists for a universal system for measuring electronic media having diverse formats, including television, radio, Internet, and online services, across a plurality of platforms. A further need exists for a cooperating system that extends the open media standards of the Internet to measure a population's exposure to and interactions with such electronic media. Yet another need exists for a system to measure traditional television, radio, cable television, digital satellite programming and advertising delivered to households that use Internet-enabled computers and appliances for viewing, listening and interacting with such content.

SUMMARY OF THE INVENTION

Generally, according to one aspect of the invention, media information presented to a panel member by means of a panel member-computing device is measured by a media research controller for subsequent reporting to one or more research customers. The panel member-computing device may receive the media information by means of a network connection, or from one or more local sources, such as prerecorded media obtained from a CD-ROM or DVD player, or may generate the media objects in real-time, or a combination thereof. The media research controller registers advertisements and other media for subsequent measurement and provides a unique identification tag that may be added to, or associated with, the existing media object for identification purposes. In addition, the present invention extracts information from, or otherwise obtains information about, presented media objects, including metadata or other information associated with a given media object, for later collection by the media research controller even when the media object has not been previously registered and tagged by the media research controller. Thus, a panel member's exposure to and interactions with all electronic media is measured, regardless of whether the media has been previously registered or tagged for identification purposes. The panel members are preferably chosen for their demographics and have agreed to participate in a research panel to have their electronic media measured.

The media research controller preferably assigns one or more software agents, hereinafter referred to as research data collection (RDC) agents, to measure each panel member's exposure to and interactions with electronic media. Thus, each research data collection agent serves as an intermediary between the local environment of a panel member and the central media research controller. In one embodiment, a research data collection agent is associated with each computing device utilized by a given panel member. Thus, a single panel member might be assigned multiple research data collection agents, if required, to measure the panel member's use of electronic media across multiple devices. Furthermore, a single research data collection agent may serve a plurality of panel members utilizing the same computing device.

According to a further aspect of the invention, cooperative media handlers are utilized by the panel member-computing device to present media to a panel member and to extract information from, or otherwise obtain information about, the media objects, including identification tags, if present, for collection by the research data collection agents. As used herein, the term cooperating system means a system that relies on the media handler software which presents the media to cooperate by gathering and developing information about media activities of end users, and transmitting such activity information to the media research controller, either directly or indirectly via the research data collection agents, in effect acting as agents of the media research controller, as opposed to conventional approaches of intercepting and interpreting the media activities of end users.

As used herein, the term media handler includes persistent software components which extend the capabilities of a software application or operating system to present media objects of a particular media type to an individual and autonomous software components, such as Java applets, which may only temporarily extend the capabilities of the host to present media. In addition, the term media handler includes software applications that generate media experiences in real-time, such as video games, and resident software components, such as the PointCast™ agent, which present media to end users. In addition, the term media handler includes those portions of an Internet browser, also called "viewers" and "plug-ins", that are capable and responsible for decoding specific media types, such as JPEG images, and using the resources of their host to present the media to the end user. The media handlers may be mobile, moving from one host computer to another, or stable, anchored to one host.

Thus, in addition to their primary function of presenting media, the cooperative media handlers also serve as software agents for the research data collection agents, by gathering and deriving relevant information about the media presentation on behalf of the research data collection agents and then sending this information to the research data collection agents. The media handlers are in the best position to provide information about the media objects presented to the panel members, since the media handler can decode the particular media type, and determine what is presented to the individual, when it is presented and how the individual interacts with the object. In this manner, the media handler can report on a panel member's exposure to and interactions with a media object, such as zooming in on a particular feature of a media object or rotating the object, and the source of the control signals, such as a specific individual or process. In the case of stable, installed media handlers, such as video games or screensaver clients; or in the case of mobile, transient media handlers, such as a Java applet advertisement, they become cooperative through the implementation of an application programming interface (API), and communicate to the research data collection agents via their host. In all of these instances, the media handler's host might contribute contextual information, such as the web site of origin, to the media handler along with the media object.

The hosts of the research data collection agent and the cooperative media handlers preferably provide them with necessary computational resources, such as processor cycles, memory and communication. In the illustrative embodiment, an Internet browser software product, such as Netscape Navigator™ or Microsoft Internet Explorer™, resident on the panel member-computing device, serves as the host for both the research data collection agent and the cooperative media handler. In alternate embodiments, the host for one or both of the research data collection agent and the cooperative media handlers may be embodied as an operating system or a virtual machine, such as the Java virtual machine. The research data collection agents and the cooperative media handlers (the hosted processes) preferably use an application programming interface (API) to define the function calls which the hosted processes and their hosts use to communicate and share resources and services. In this manner, different companies can develop interoperable research data collection agents, cooperative media handlers and hosts.

When electronic media is received by a cooperative media handler, the media handler automatically extracts information from, or otherwise obtains information about, the media, including an identification tag, if present, for transmission to a research data collection agent. In addition to the extracted identification tag, if present, the cooperative media handler preferably transmits any content metadata included in or associated with the media object, an indication of the media handler's identification number and any contextual information which has been made available to the media handler by its host, including program, episode, version, and source information for television and radio programming, or a source computer's domain name or IP address for a web site, and content rating information, such as PICS, if available.

A research data collection agent preferably commences tracking of a panel member, and begins collecting such transmissions from the cooperative media handlers, when a panel member enters the scope of the research data collection agent and has been identified and authenticated, for example, following a log on procedure. Similarly, the research data collection agent suspends tracking of a panel member when the person leaves the scope of the remote media research agent, such as following a log off procedure. The research data collection agent (i) creates log entry objects from transmissions received from the cooperative media handlers and places the log entry objects into an unfiltered media queue, (ii) confirms the integrity of the messages and filters out unnecessary log entry objects from the unfiltered media queue to create a filtered media queue, (iii) creates dispatch objects using objects from the filtered media queue and places created dispatch objects into a dispatch queue, and (iv) transmits dispatch objects from the dispatch queue to the media research controller, when resources are available.

Identification tags are preferably placed at periodic intervals throughout the duration of continuous media, such as audio and video, or on an associated data channel. Since identification tags might be utilized by hostile software to automatically remove advertising media objects, the identification tags are preferably placed in both the advertising, as well as the associated advertising-supported media objects to discourage such automatic removal. In one preferred embodiment, "real" identification tags are placed in media that is to be measured (and a fraction of media that is not to be measured), and "dummy" identification tags are placed in other content. The research data collection agents can preferably distinguish real identification tags from dummy identification tags, and, if desired for efficiency purposes, can only return measurements about registered media objects containing real identification tags to the media research controller.

A more complete understanding of the present invention, as well as further features and advantages of the present invention, will be obtained by reference to the following detailed description and drawings.

BRIEF DESCRIPTION OF THE DRAWINGS

FIG. 5 illustrates a sample table from the panel member database table of FIG. 2;

FIG. 6 illustrates a sample table from the registered media database table of FIG. 2;

FIG. 7 illustrates a sample table from the encryption keys database table of FIG. 2;

FIG. 8 illustrates a sample table from the log entry database table of FIG. 2;

FIG. 9 illustrates a sample table from the local panel member database table of FIG. 3;

FIG. 10 illustrates a sample table from the local encryption keys database table of FIG. 3;

DETAILED DESCRIPTION

Figure 1:
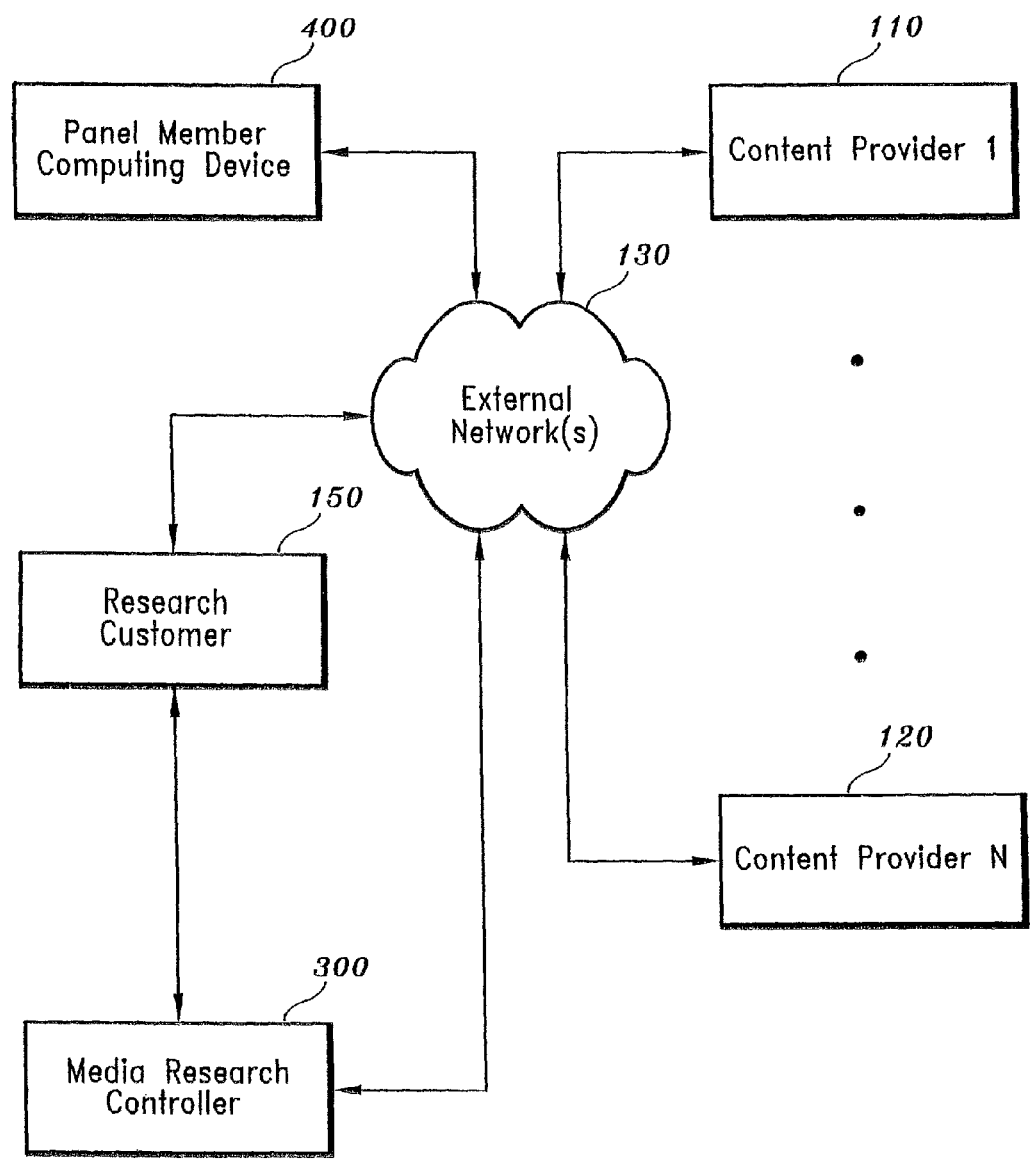
FIG. 1 is a schematic block diagram illustrating a suitable communications network for interconnecting a panel member with one or more content providers and a media research controller of an electronic media measurement system.

FIG. 1 shows an illustrative network environment for transferring media information, such as video, audio and data, from one or more content providers 110, 120, to a panel member 205 operating a panel member-computing device 400, discussed further below in conjunction with FIG. 4, over one or more external networks, such as network 130. In an alternative or supplemental embodiment, discussed further below, the panel member-computing device 400 may be configured to receive media information from one or more local sources, such as prerecorded media obtained from a CD-ROM or DVD player, or to generate media objects in real-time, for example, by means of a video game generating an advertising image with the name of the panel member for placement on a wall inside a virtual world, or a combination thereof. According to a feature of the present invention, the media information presented to the panel member by means of the panel member-computing device 400 is measured by a media research controller 300, discussed further below in conjunction with FIG. 3, for subsequent reporting to one or more research customers 150. It is noted that the reports may be generated by the media research controller 300 in real time, or historically, or both.

The external networks 130 shown in FIG. 1 include the Internet, the Public Switched Telephone Network ("PSTN") and networks for the delivery of radio and television programming, such as the Digital Satellite Service ("DSS™"), cable television ("CATV") and other over-the-air transmission networks for broadcast television, radio and satellite communications. The PSTN, as used herein, includes the combination of local and long distance wire or wireless facilities and switches, as well as cellular network systems. The Internet, as used herein, includes the World Wide Web (the "Web") and other systems for storing and retrieving information using the Internet.

According to a feature of the present invention, the media research controller 300 registers advertisements and other media for subsequent measurement and provides a unique identification tag that may be added to, or associated with, the existing media object for identification purposes. In addition, the present invention extracts information from, or otherwise obtains information about, presented media objects, including metadata or other information associated with a given media object, for later collection by the media research controller 300 even when the media object has not been previously registered and tagged by the media research controller 300. In this manner, the present invention measures a panel member's exposure to and interactions with all electronic media, regardless of whether the media has been previously registered or tagged for identification purposes. The panel members are preferably chosen for their demographics and have agreed to participate in a research panel to have their electronic media measured. The panel is preferably constructed so that it is representative of and projectable to the entire population. It is noted that if a census is desired, as opposed to a panel, the panel simply consists of the entire population of interest.

Entity Relationships and Interfaces

Figure 2:
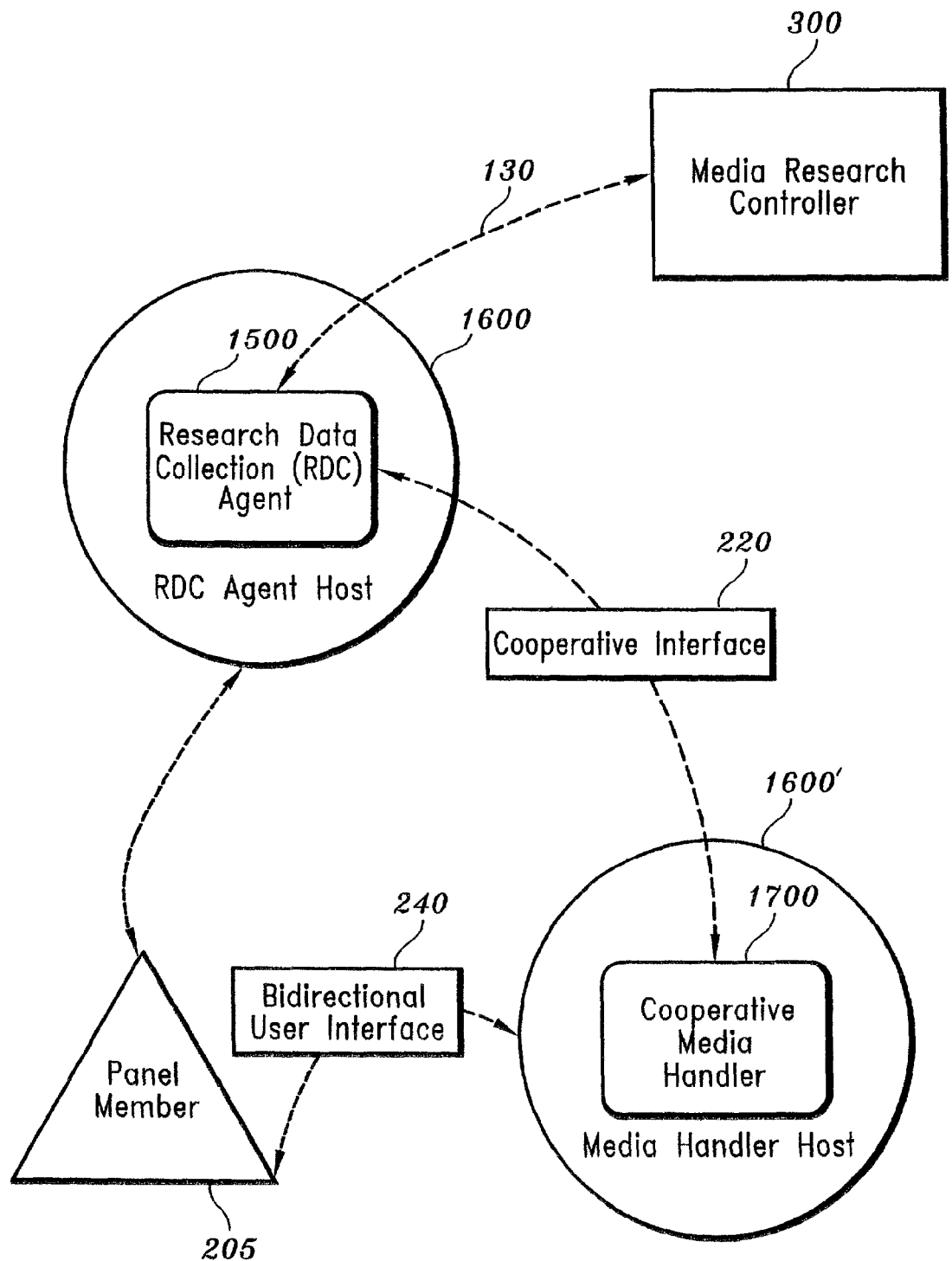
FIG. 2 illustrates the communications and cooperative relationship between the various entities shown in FIGS. 1, 3 and 4.

As shown conceptually in FIG. 2, the present invention preferably consists of a number of cooperating entities to measure electronic media presented to a panel member 205 by means of the panel member-computing device 400, namely, a centralized media research controller 300, a research data collection agent 1500 and a cooperative media handler 1700. As previously indicated, the media research controller 300 measures a panel's exposure to and interactions with electronic media for subsequent reporting to one or more research customers 150. As used herein, the term cooperating system means a system that relies on the media handler software which presents the media to cooperate, by gathering and developing information about media activities of end users, and transmitting such activity information to the media research controller, either directly or indirectly via the research data collection agents, in effect acting as agents of the media research controller, as opposed to conventional approaches of intercepting and interpreting the media activities of end users.

To this end, the media research controller 300 preferably assigns one or more software agents, referred to as research data collection agents 1500, discussed further below in conjunction with FIG. 15, to measure each panel member's exposure to and interactions with electronic media. Thus, each research data collection agent 1500 serves as an intermediary between the local environment of a panel member 205 and the central media research controller 300. In one embodiment, a research data collection agent 1500 is associated with each computing device 400 utilized by a given panel member 205. Thus, a single panel member might be assigned multiple research data collection agents, if required to measure the panel member's use of electronic media across multiple devices. Furthermore, a single research data collection agent 1500 may serve a plurality of panel members utilizing the same computing device 400. It is not necessary for the research data collection agent 1500 to be proximal to the associated panel member or the panel member's physical environment. Since the research data collection agent 1500 is user-centric, the agent 1500 might be a component of the person's net-centric environment and be activated as a side effect of the person obtaining access to network resources, or the agent 1500 may reside on a smartcard carried by the individual.

Figure 17:
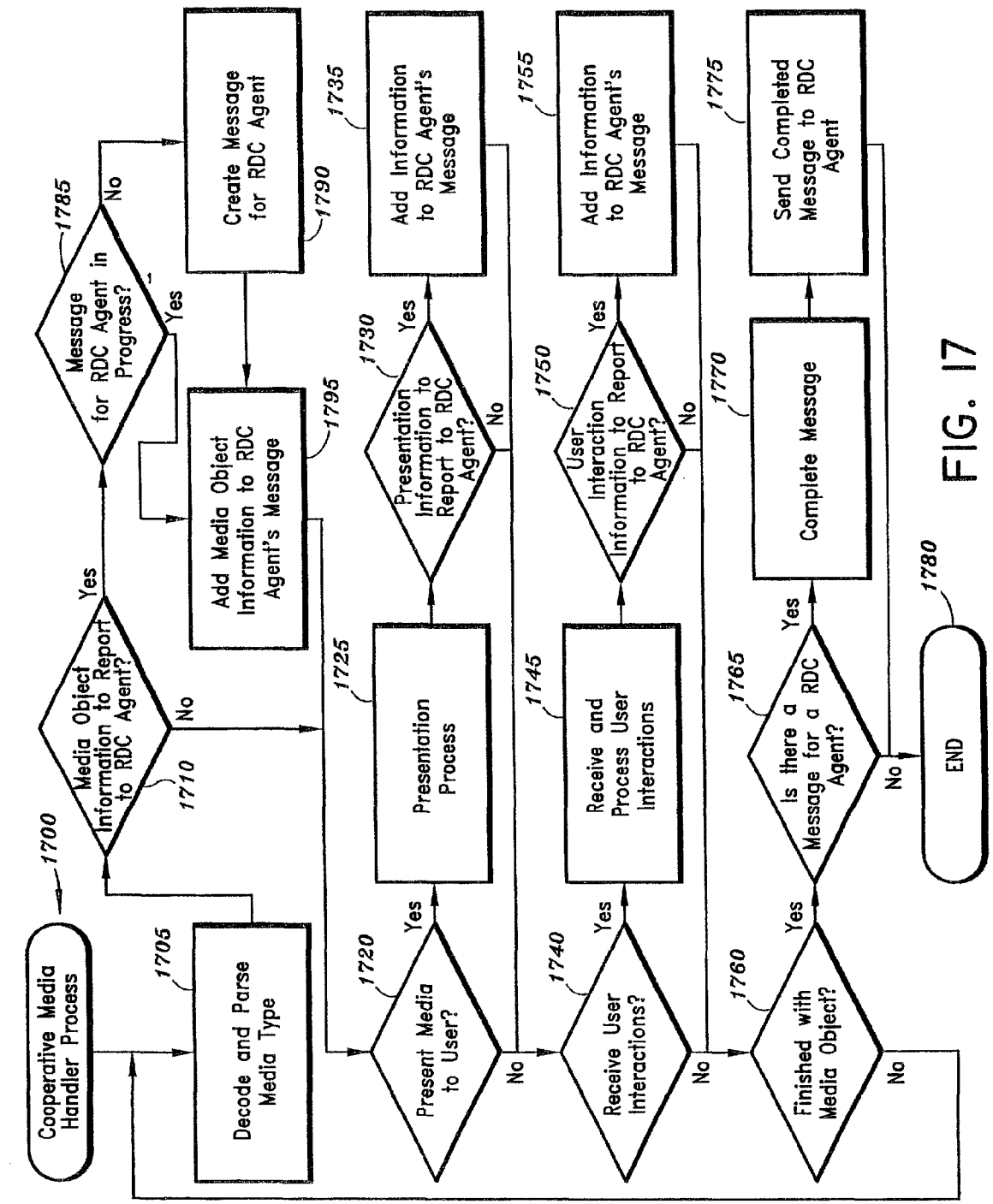
FIG. 17 is a flow chart describing a cooperative media handler process as implemented by the panel member-computing device of FIG. 4.

In addition, the cooperative media handlers 1700, discussed below in conjunction with FIG. 17, are utilized by the panel member-computing device 400 to present media to the panel member 205 and to extract information from, or otherwise obtain information about, presented media objects, including identification tags, if present, for collection by the research data collection agents 1500. Thus, in addition to their primary function of presenting media, the cooperative media handlers 1700 also serve as software agents for the research data collection agents 1500, by gathering and deriving relevant information about the media presentation on behalf of the research data collection agents and then sending this information to the research data collection agents. It is noted that while some of the media handlers might be implemented as cooperative media handlers 1700, as described herein, the present invention is not dependent upon all of the media handlers being implemented in a cooperative manner. However, the extent of research data collection agent's 1500 ability to measure a panel member's exposure to and interactions with electronic media is limited to media presented by means of a cooperative media handler 1700.

As used herein, a software agent is a software component that has the ability and authority to act on behalf of a controlling entity, generally instantiated as a process on a host computer. Each agent's controlling entity provides the agent with resources, such as encryption keys and a digital certificate for identification, and delegates specific tasks to the agent. The software agents manage these tasks, and operate in an autonomous or semi-autonomous mode with respect to its controlling entity. The software agents may be mobile, moving from one host computer to another, or stable, anchored at one host.

The software agent's host preferably provides the software agent with necessary computational resources, such as processor cycles, memory and communication. In the illustrative embodiment, discussed further below, an Internet browser software product, such as Netscape Navigator™ or Microsoft Internet Explorer™, resident on the panel member-computing device 400, serves as the host 1600 for the research data collection agent 1500 and the host 1600' for the cooperative media handler 1700 and provides them with the required computational resources. In alternate embodiments, the host for one or both of the research data collection agent and the cooperative media handlers may be embodied as an operating system or a virtual machine, such as the Java virtual machine. The research data collection agent 1500 preferably communicates with the media research controller 300 by means of the host's secure communication capabilities, such as SSL or S/MIME. In addition, the research data collection agent 1500 relies on its host 1600 to pass through data sent by the cooperative media handler 1700 for collection by a research data collection agent 1500.

The communications between the various entities are preferably sufficiently encrypted to protect the privacy of the panel members 205, the proprietary information and competitive interests of the media research controller 300 and the validity of the collected data, as would be apparent to a person of ordinary skill. Furthermore, to protect the privacy of non-panel members, the cooperative features of the hosts 1600, 1600', as described herein, are preferably initially disabled when distributed to end-users, and are only subsequently enabled when specifically authorized by a panel member who has agreed to participate in a research panel.

In some embodiments, the research data collection agent 1500 is not proximal to the panel member(s) it tracks, or the panel member's physical environment. For example, the research data collection agent might be hosted by the central computer of an online service. In other embodiments, the research data collection agent is hosted separately from the cooperative media handlers. For example, the research data collection agent 1500 might be located in a wristwatch worn by the panel member. Thus, the host services and resources may reside locally or be accessed by means of a network connection, or a combination thereof, as would be apparent to a person of ordinary skill. It is noted that the research data collection agents 1500 and the cooperative media handlers 1700 might typically share the same host or might be hosted separately, for example, in an embodiment where the media research data collection agent 1500 associated with a panel member 205 is resident on a smartcard or wristwatch carried by an individual.

As illustrated in FIG. 2, the present invention relies on a number of cooperative interfaces between the various entities. A media object is presented to a panel member 205 by the cooperative media handler 1700 using a conventional bi-directional user interface 210. The cooperative media handler 1700 transmits identification tags and other information extracted from, or otherwise obtained about, media objects for collection by a research data collection agent 1500, by means of a cooperative interface 220. Upon receipt of an extracted identification tag or other obtained information from a media handler 1700, the research data collection agent 1500 sends a message to the media research controller 300, preferably over an external network 130, containing the extracted identification tag and other obtained information.

In addition, as previously indicated, the research data collection agents 1500 and the cooperative media handlers 1700 also require interfaces to their respective hosts 1600, 1600'. In a preferred embodiment, the research data collection agents 1500 and the cooperative media handlers 1700 (the hosted processes) use an application programming interface (API) to define the function calls which the hosted processes and their hosts, such as the host 1600, use to communicate and share resources and services. In this manner, different companies can develop interoperable research data collection agents, cooperative media handlers and hosts.

Entity Functions

As previously indicated, when electronic media is received by a cooperative media handler 1700 for presentation, the media handler 1700 automatically extracts information from, or otherwise obtains information about, presented media object, including an identification tag, if present, and other relevant information, as available, for transmission to a research data collection agent 1500. In addition to the extracted identification tag, if present, the cooperative media handler 1700 preferably transmits any content metadata included in or associated with the media object, including program and episode information; an identification of media handler and its host; any contextual information which has been made available to the media handler 1700, such as an indication of the media source for television and radio programming, or a source computer's domain name or IP address for a web site; any presentation information or user interaction information, and content rating information, such as PICS, if available. Each of these information types is discussed further below in conjunction with FIG. 8.

A research data collection agent 1500 preferably commences tracking of a panel member, and begins collecting such transmissions from the cooperative media handlers 1700, when a panel member enters the scope of the research data collection agent 1500 and has been identified and authenticated, for example, following a log on procedure. Similarly, the research data collection agent 1500 suspends tracking of a panel member 205 when the person leaves the scope of the remote media research agent 1500, such as following a log off procedure. The research data collection agent (i) creates log entry objects from transmissions received from the cooperative media handlers and places the log entry objects into an unfiltered media queue, (ii) confirms the integrity of the messages and filters out unnecessary log entry objects from the unfiltered media queue to create a filtered media queue, (iii) creates dispatch objects using objects from the filtered media queue and places created dispatch objects into a dispatch queue, and (iv) transmits dispatch objects from the dispatch queue to the media research controller, when resources are available.

The cooperative media handlers 1700 preferably are not aware of whether or not a research data collection agent 1500 is present and measuring the content presented to a panel member, for the same reason that the identities of Nielsen families are carefully concealed from the media sources that Nielsen measures, to prevent manipulation of the content presented to the panel members. Thus, the cooperative media handlers 1700 preferably transmit information extracted from, or otherwise obtained about, presented media objects, for collection by a research data collection agent 1500, whether or not a research data collection agent 1500 is present. For efficiency purposes, however, when the same host 1600 is hosting both the research data collection agent 1500 and media handler 1700, the host may inhibit the cooperative media handler 1700 from transmitting information extracted from or obtained about media objects when a research data collection agent 1500 is not present, is not in a tracking mode or the panel members are not in scope.

According to a feature of the present invention, the media handlers 1700 thus cooperate with the research data collection agents 1500 by gathering and deriving relevant information about the media presentation on behalf of the research data collection agents and then sending this information to the research data collection agents. The media handlers 1700 are in the best position to provide information about the media objects presented to the panel members 205, since the media handler is responsible for decoding or generating specific media objects, they determine what is presented, how it is presented, when it is presented and how the panel member 205 interacts with the presented media. Additionally, the media handlers 1700 can extract metadata from the media object and glean contextual information about the media object from the media handler's host. Through their cooperation and assistance, the research data collection agent can gain access to information that might not be available in any other way.

Since the media research controller 300 can measure a panel's exposure to and interactions with the cooperative media handlers 1700 themselves, in addition to exposure to and interactions with the underlying media objects of interest, providers of media handlers are motivated to develop media handlers which cooperate with the software processes of the present invention, and thereby ensure that the media handlers provide the required functionality. In this manner, media handler developers can receive custom research reports to analyze the panel's exposure to and interactions with such media handlers.

Media Terminology

A media type is a means to represent media information, such as an image or a sound. For example, the PNG (Portable Network Graphics) file format is a media type for representing computer images. As used herein, a media object is an item or instance of a media type. Currently, there are hundreds of media types in use. Typically, media types are implemented as files, and increasingly as objects, and allow for some means of attaching metadata, or information about the data. In some cases, the metadata is implemented as a text field that resides in a header preceding the content data and can be extracted prior to decoding the content data. Generally, extraction of the header data is not computationally intensive, and can take place prior to or during the decoding and display or playback of the content.

Every media type must have a corresponding media handler, located at the end-user's client side to present a given media object to an individual. As used herein, the term media handler includes persistent software components which extend the capabilities of a software application or an operating system to present media objects of a particular media type to an individual and autonomous software components, such as Java applets, which may only temporarily extend the capabilities of the host to present media. In addition, the term media handler includes software applications that generate media experiences in real-time, such as video games, and resident software components, such as the PointCast™ agent, which present media to end users. In addition, the term media handler includes those portions of an Internet browser, also called "viewers" and "plug-ins", that are capable and responsible for decoding specific media types, such as JPEG images, and using the resources of their host to present the media to the end user. The media handlers may be mobile, moving from one host computer to another, or stable, anchored to one host.

Typically, an Internet browser software product has a collection of internal media handlers, such as JPEG and GIF decoders. When a browser encounters a media object of a given media type, the browser transfers the media object to the appropriate media handler for decoding. In addition, most browsers incorporate "plug-in" architecture, which allows third parties to develop new media types and distribute corresponding media handlers as "plug-ins." For example, Netscape Navigator™ currently has over two hundred compatible plug-ins available.

It is noted that for continuous media, such as audio and video, identification tags are preferably placed at periodic intervals throughout the duration of the media or on an associated data channel. Since the identification tags might be utilized by hostile software to automatically remove advertising, the identification tags are preferably placed in both the advertising, as well as the associated advertising-supported media objects to discourage such automatic removal. In one preferred embodiment, discussed below in conjunction with FIG. 12, real identification tags are placed in media that is to be measured (and a fraction that is not), and dummy identification tags are placed in other content. As discussed further below, in order to permit the research data collection agents 1500 to be tasked by the media research controller 300 to report only registered media, the research data collection agent 1500 can preferably distinguish real identification tags from dummy identification tags, and, if desired, return only real identification tags to the media research controller 300.

Media Research Controller

Figure 3:
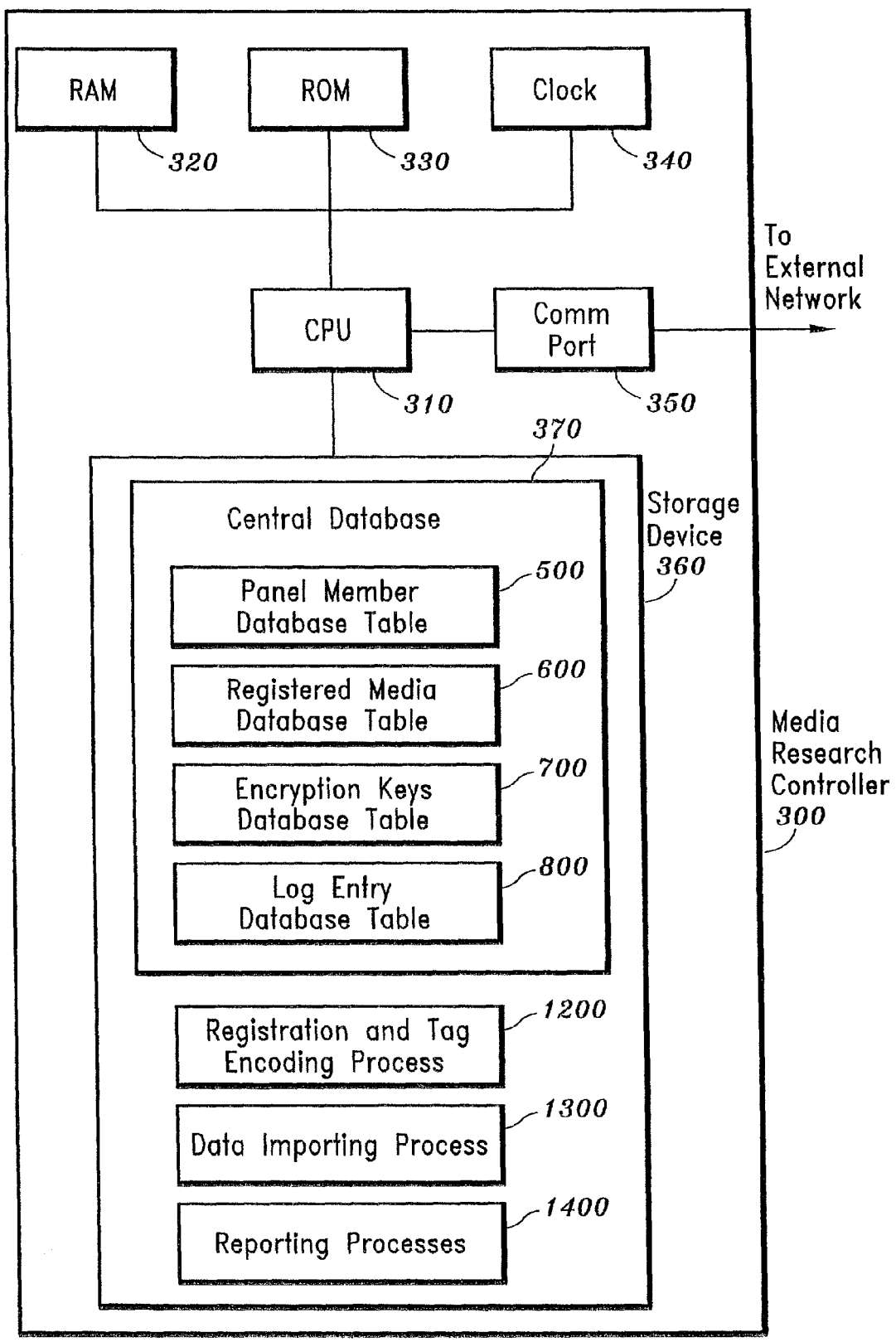
FIG. 3 is a schematic block diagram of the media research controller of FIG. 1.

FIG. 3 is a block diagram showing the architecture of an illustrative media research controller 300. The media research controller 300 preferably includes certain standard hardware components, such as a central processing unit (CPU) 310, a random access memory (RAM) 320, a read only memory (ROM) 330, a clock 340, a communications port 350, and a data storage device 360. The CPU 310 is preferably linked to each of the other listed elements, either by means of a shared data bus, or dedicated connections, as shown in FIG. 3.

The CPU 310 may be embodied as a single commercially available processor, such as Intel's Pentium 100 MHz P54C microprocessor, Motorola's 120 MHz PowerPC 604 microprocessor or Sun Microsystem's 166 MHz UltraSPARC-I microprocessor. Alternatively, the CPU 310 may be embodied as a number of such processors operating in parallel, on one or more distributed processing nodes. The data storage device 360 and/or ROM 330 are operable to store one or more instructions, as discussed below in conjunction with FIGS. 12 through 14, which the CPU 310 is operable to retrieve, interpret and execute. The CPU 310 preferably includes a control unit, an arithmetic logic unit (ALU), and a CPU local memory storage device, such as, for example, an instruction cache or a plurality of registers, in a known manner. The control unit is operable to retrieve instructions from the data storage device 360 or ROM 330. The ALU is operable to perform a plurality of operations needed to carry out instructions. The CPU local memory storage device is operable to provide high-speed storage used for storing temporary results and control information.

As discussed further below in conjunction with FIGS. 5 through 8, the data storage device 360 includes a central database 370 for storing a panel member database table 500, a registered media database table 600, an encryption keys database table 700 and a log entry database table 800. The panel member database table 500 preferably stores personal and demographic information for each member of the panel. The registered media database table 600 preferably stores information about each media object that is registered with the media research controller 300, including the assigned tag identification number. The encryption keys database table 700 preferably stores the public key/private key pairs that are utilized in the illustrative embodiment to implement secure communications. The log entry database table 800 preferably stores information that has been extracted from or obtained about media objects presented to panel members and provided to the media research controller 300 by the remote media research agents 1500.

In addition, as discussed further below in conjunction with FIGS. 12 through 14, the data storage device 360 preferably includes a registration and tag encoding process 1200, a data importing process 1300 and a reporting process 1400. Generally, the registration and tag encoding process 1200 registers a particular media object, and then places an assigned tag identification number in the registered media object, or otherwise associates the tag identification number with the media object. The data importing process 1300 receives log dispatches from the remote media research agents 1500, verifies the authenticity and integrity of the received messages and places confirmed entries in the log entry table 800. The reporting process 1400 preferably generates reports in real-time or historically, to suit the needs of a particular research customer 150.

The communications port 350 connects the media research controller 300 to the external networks 130, thereby linking the media research controller to each remote media research agent, as shown in FIGS. 1 and 2. The communications port 350 preferably includes multiple communication channels for simultaneously connecting the media research controller 300 to multiple research data collection agents.

Panel Member-computing Device

Figure 4:
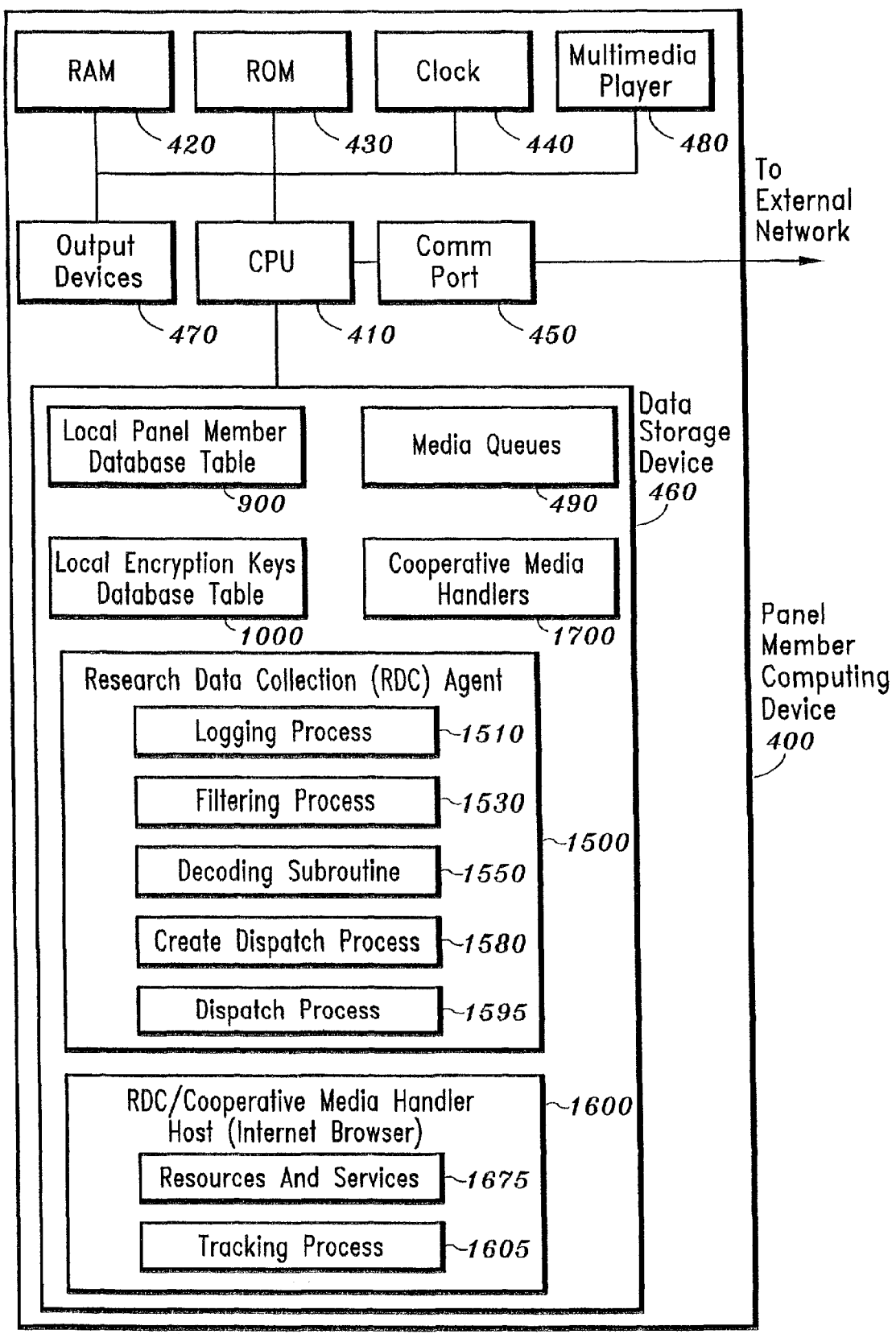
FIG. 4 is a schematic block diagram of a panel member-computing device of FIG. 1.

FIG. 4 is a block diagram showing the architecture of an illustrative panel member-computing device 400. The panel member-computing device 400 may be embodied as any device which presents media to individuals, including, for example, an Internet-enabled device, such as a network computer, a set-top box, a television, a telephone, pager, or personal digital assistant. The panel member-computing device 400 typically includes certain standard hardware components, such as a central processing unit (CPU) 410, a random access memory (RAM) 420, a read only memory (ROM) 430, a clock 440, a communications port 450, and a data storage device 460. Each of these components 410, 420, 430, 440, 450 and 460 may be identical to the corresponding components described above in conjunction with FIG. 2. In addition, the panel member-computing device 400 may include one or more output devices 470, such as a video display card and video monitor, a sound card and speaker, and one or more multimedia players 480, such as a CD-ROM or DVD device.

As discussed further below in conjunction with FIGS. 9 through 11, the data storage device 460 includes a local panel member database table 900, a local encryption keys database table 1000 and media queues 490. The local panel member database table 900 preferably stores an indication of whether each panel member associated with a given research data collection agent is currently within the scope of the agent. The local encryption keys database table 1000 preferably stores each of the public key values which are required by the research data collection agent 1500 to determine if a given extracted tag is a real tag or a dummy tag and for secure communications with the media research controller 300. The media queues 490 preferably store information that has been extracted from or obtained about media objects presented to panel members and provided to the research data collection agent by the media handlers. As discussed further below in conjunction with FIGS. 15a through 15f, the media queues 490 preferably consist of an unfiltered media queue 1150, a filtered media queue 1170, each containing log entry objects 1100, and a dispatch queue 1190, containing dispatch objects 1130.

In addition, as discussed further below in conjunction with FIGS. 15 through 17, the data storage device 460 preferably includes a research data collection (RDC) agent 1500, a RDC/cooperative media handler host 1600 and one or more cooperative media handlers 1700. The research data collection (RDC) agent 1500 preferably includes (i) a logging process 1510 to create log entry objects from transmissions received from the cooperative media handlers and places the log entry objects into an unfiltered media queue, (ii) a filtering process 1530 to confirm the integrity of the messages and filter out unnecessary log entry objects from the unfiltered media queue, using a decoding subroutine 1550 to create a filtered media queue, (iii) a create dispatch process 1580 to create dispatch objects using objects from the filtered media queue and that places created dispatch objects into a dispatch queue, and (iv) a dispatch process 1595 to transmit dispatch objects from the dispatch queue to the media research controller, when resources are available. The RDC/cooperative media handler host 1600 preferably provides resources and services 1675 to hosted processes and executes a tracking process 1605 to notify the research data collection agents 1500 when a panel member enters or exits the agent's scope. The cooperative media handlers 1700 preferably receive and decode media objects and extract information from, or otherwise obtain information about, presented media objects, including identification tags, if present, for collection by research data collection agents 1500.

It is noted that the research data collection agent process 1500 and related database tables 900, 1000, 1100 have been shown as part of the panel member-computing device 400 for illustrative purposes only, and could be resident on a device physically remote from the panel member 205 in alternate embodiments, as previously indicated, such as part of the panel member's net-centric environment which is activated as a side effect of the person obtaining access to network resources, or resident or hosted within a wristwatch that the panel member wears.

The communications port 450 connects the panel member-computing device 400 to the external networks 130, thereby linking the computing device 400 to the media research controller 300 and content providers 110, 120, as shown in FIGS. 1 and 2. The communications port 450 preferably includes multiple communication channels for simultaneous connections.

Database Tables

FIG. 5 illustrates an exemplary panel member database table 500 that preferably stores personal and demographic information for each member of the panel. The panel member database table 500 maintains a plurality of records, such as records 505-520, each associated with a different panel member. For each panel member identified by a panel member identifier in field 540, the panel member database table 500 includes the panel member's name, sex, age, city and state in fields 545 through 565, respectively. In addition, the panel member database table 500 includes an indication of the member's education level and income in fields 570 and 575, the associated research data collection agent in field 580, and the member's email address in field 585. The panel member identifier stored in field 540 may be utilized, for example, to index the log entry table 800, discussed below in conjunction with FIG. 8.

FIG. 6 illustrates an exemplary registered media database table 600 which preferably stores information about each media object which is registered with the media research controller 300, including the assigned tag identification number. The registered media database table 600 maintains a plurality of records, such as records 605-620, each associated with a different registered media object. For each registered media object identified by a registered media identification number ($M_1$) in field 640, the registered media database table 600 includes an indication of the entity which registered the object, the associated agency and the media type in fields 645 through 655, respectively. In addition, an encrypted and digitally signed version of registered media identification number preferably serves as the identification tag, $C_2$, and is recorded in field 660. Finally, the anticipated starting and ending dates for which the media object will be distributed are recorded in fields 665 and 670.

FIG. 7 illustrates an exemplary encryption keys database table 700 that preferably stores the public key/private key pairs which are utilized by the media research controller 300 in the illustrative embodiment to implement encrypted communications with the various entities and other security features. In a preferred embodiment, the media research controller 300 generates public key/private key pairs and securely distributes the various public keys to the research data collection agents of the panel members. In some embodiments, the agents may be provided with initial public keys prior to distributing the agent. Thus, the encryption keys database table 700 maintains a plurality of records, such as records 705-720, each associated with a different public key/private key pair. For each pair, identified by a key pair identifier in field 740, the encryption keys database table 700 includes an indication of the key pair owner in field 745, namely, the entity which holds the private key, such as the research data collection agent (RDCA) 1500 or the media research controller (MRC) 300. In addition, the encryption keys database table 700 includes the corresponding public key and private key values in fields 750 and 755, respectively.

FIG. 8 illustrates an exemplary log entry database table 800 which preferably stores information which has been extracted from or obtained about media objects presented to panel members and provided to the media research controller 300 by the research data collection agents, in a manner described further below. The log entry database table 800 maintains a plurality of records, such as records 805-820, each associated with a different log entry. For each log entry identified by an entry identifier in field 830, the log entry database table 800 includes an identifier of the research data collection agent 1500, cooperative media handler 1700, and media handler host 1600' associated with the log entry object in fields 835, 840 and 842, respectively. In this manner, the research media controller 300 can generate custom reports to analyze a panel's exposure to and interactions with the media handlers 1700 and media handler hosts 1600' themselves, in addition to the underlying media objects of interest. In addition, each logged entry includes an identifier of the particular media object and panel member associated with the entry in fields 845 and 850, as well as date and time stamps in fields 855 and 860. Each entry preferably also includes any metadata, contextual information, presentation information, and user interactions that were received in the log entry object, in fields 865, 870, 875 and 880, respectively.

As shown in FIG. 8, the metadata in field 865 may include program identification information and the corresponding media type. The contextual information in field 870 may include the URL and other information indicating the source of the corresponding media object, or the context in which it was presented to the panel member. The presentation information in field 875 may include the language and format in which the media object was presented to the panel member, or other information indicating how the objected was presented to the panel member, when alternative presentations are possible. Finally, the user interactions in field 880 may specify how the panel member interacted with the object, including whether the panel member zoomed in on portions of the media object, or rotated the object, as well as the size of the media object and any user inputs.

FIG. 9 illustrates an exemplary local panel member database table 900 which preferably stores a semaphore indicating whether each panel member associated with a given research data collection agent is currently within the scope of the agent. The local panel member database table 900 maintains a plurality of records, such as records 905-915, each associated with a different panel member. For each panel member identified by a panel member identifier in field 940, the local panel member database table 900 contains a semaphore in field 945 indicating whether or not the panel member is in scope.

FIG. 10 illustrates an exemplary local encryption keys database table 1000 which preferably stores each of the encryption key values which are required by the research data collection agent 1500 to determine if a given extracted tag is a real tag or a dummy tag and for secure communications with the media research controller 300. The local encryption keys database table 1000 maintains a plurality of records, such as records 1005-1020, each associated with a different encryption key. For each public key identified by a local key identifier in field 1040, the local encryption keys database table 1000 includes a key pair identifier in field 1045 and the key value in field 1050.

Figure 11:
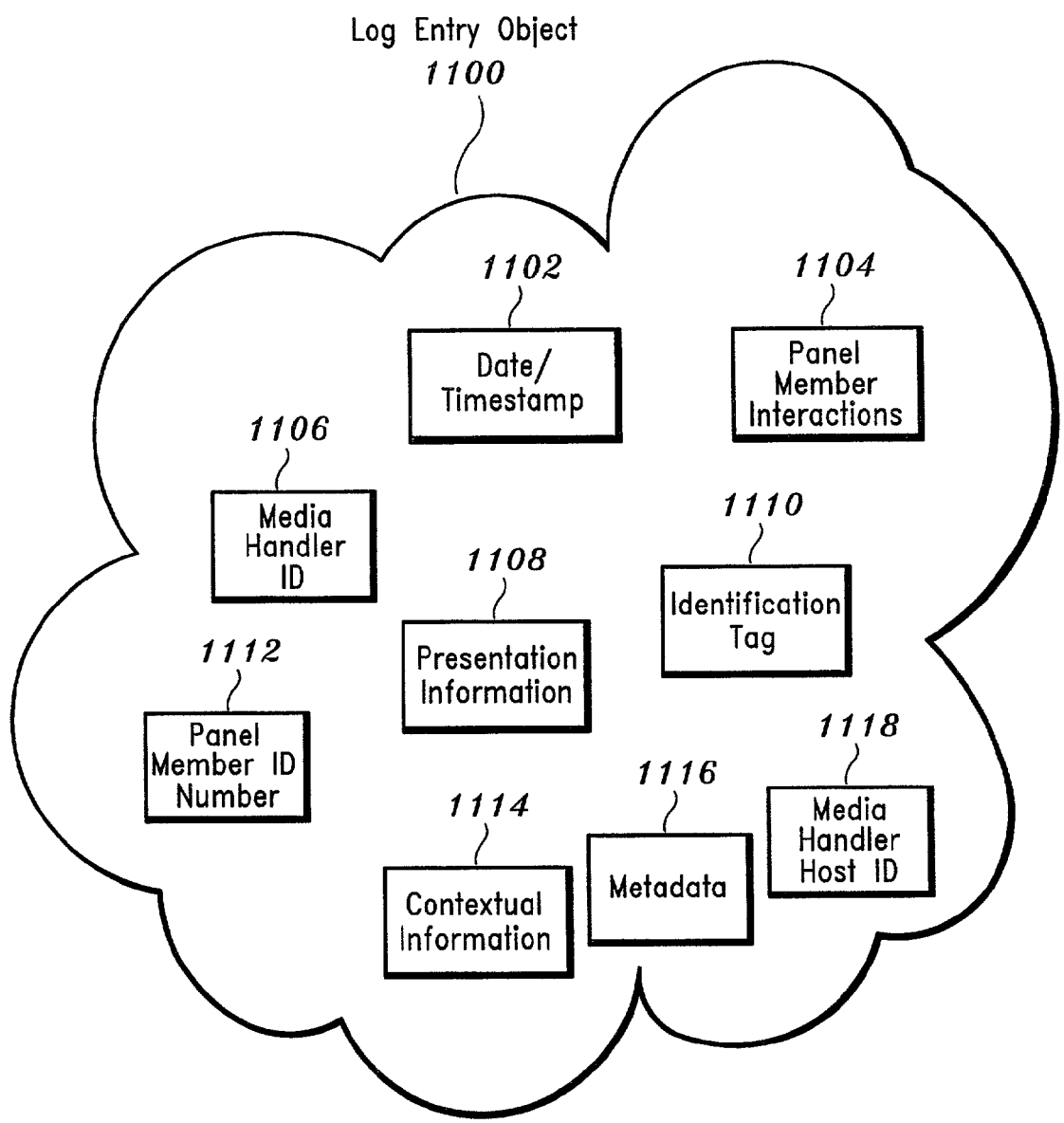
FIG. 11 illustrates a sample log entry object from the media queues of FIG. 3.

FIG. 11 illustrates an exemplary log entry object 1100 from the media queues 490, which preferably stores information which has been extracted from or obtained about a given media object presented to one or more panel members and provided to the research data collection agent 1500 by the cooperative media handlers 1700. The log entry object 1100 consists of a plurality of elements, including a date/time stamp 1102, panel member interactions 1104, media handler identifier 1106, presentation information 1108, identification tag 1110, panel member identifier 1112, contextual information 1114, metadata 1116 and the media handler host identifier 1118. Each of these information types has been described above in conjunction with FIG. 8. In addition, the log entry object 1100 can include a copy of the media object itself, if desired.

Processes

Figure 12A:
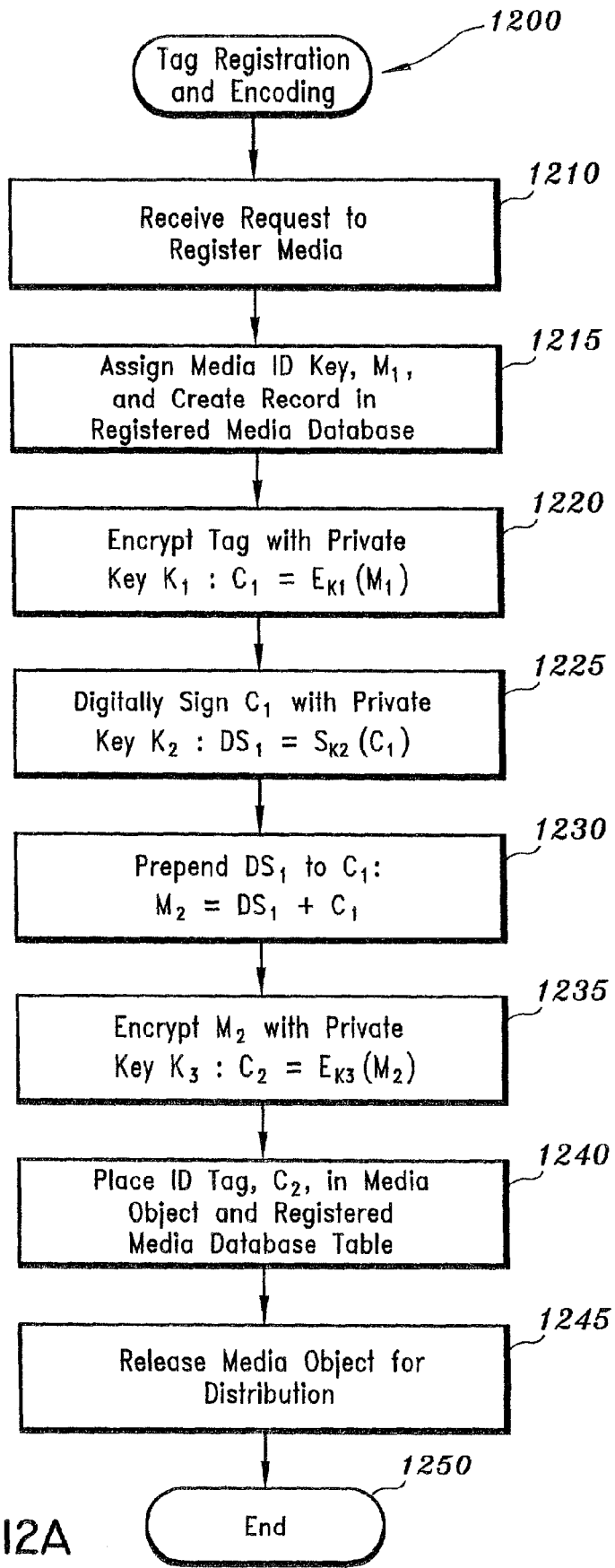
FIG. 12a is a flow chart describing an exemplary tag registration and encoding process as implemented by the media research controller of FIG. 3.
Figure 12B:
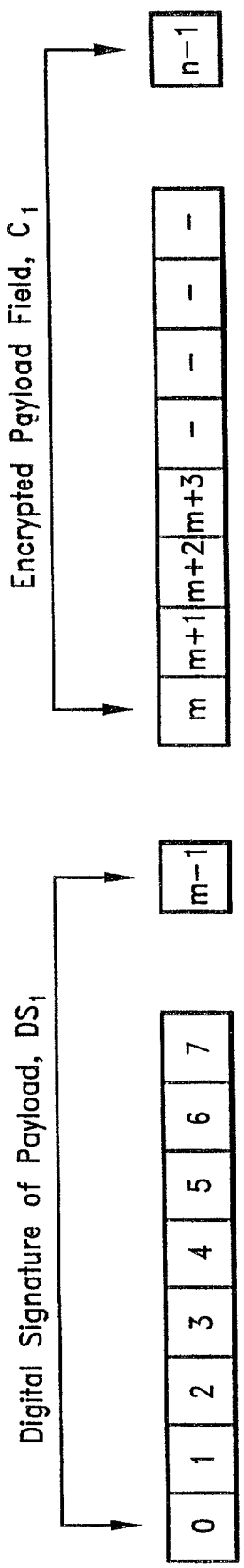
FIGS. 12b and 12c illustrate an exemplary identification tag format definition for a real identification tag and a dummy identification tag, respectively.

As discussed above, the media research controller 300 preferably executes a tag registration and encoding process 1200, shown in FIG. 12*a*, to register a particular media object, and to place an assigned tag identification number in the registered media object, or on a simultaneous channel. As illustrated in FIG. 12*a*, the media research controller 300 begins the processes embodying the principles of the present invention during step 1210 upon receipt of a request to register a particular media object.

Thereafter, the media research controller 300 assigns a media identification key, $M_1$, during step 1215 and creates a record of the media object in the registered media database table 600. In one embodiment, the identification tags are based on an extended version of the ISCI standard. In a preferred embodiment, the media research controller 300 utilizes a doubly encrypted identification tag to protect the security of the media identification key, which is preferably never made available outside the media research controller 300. Thus, the assigned media identification key, $M_1$, is preferably strongly encrypted with a private key, $K_1$, during step 1220 to produce a payload, $C_1$. Thereafter, the payload, $C_1$, is digitally signed with a private key, $K_2$, to create a digital signature, $DS_1$, during step 1225 and then the digital signature, $DS_1$, is prepended to the payload, $C_1$, during step 1230 to produce a new message, $M_2$, shown in FIG. 12*b*. It is noted that the new message, $M_2$, may optionally include bit padding to increase $C_1$ to a predefined length. Finally, the new message, $M_2$, is encrypted with a private key, $K_3$, during step 1235 to produce a real tag, $C_2$. For a more detailed discussion of suitable encryption and security techniques, see B. Schneier, Applied Cryptography (2d ed. 1997), incorporated by reference herein.

Thereafter, the real tag, $C_2$, is placed in the media object during step 1240, or on a simultaneous channel, and also placed in field 660 of the registered media database 600. The identification tag can be bound to the content in a variety of ways. Preferably, the advertisement or other media is represented as an object, and has been designed to implement the cooperative approach associated with the present invention by reserving a field or sub-object for storing the identification tag. It is important that the identification tag does not interfere in any way with the normal use of the media by any media handler or media handler host that has not implemented the cooperative API described herein. Binding can be generally achieved since the most prevalent media file formats and datatypes support extension through user-defined chunks or objects. As a last resort, the identification tag might be stored within an embedded comment field, into its URL, or even through steganography (hidden codes).

Finally, the media object is released for distribution during step 1245, before program control ends during step 1250.

Figure 12C:
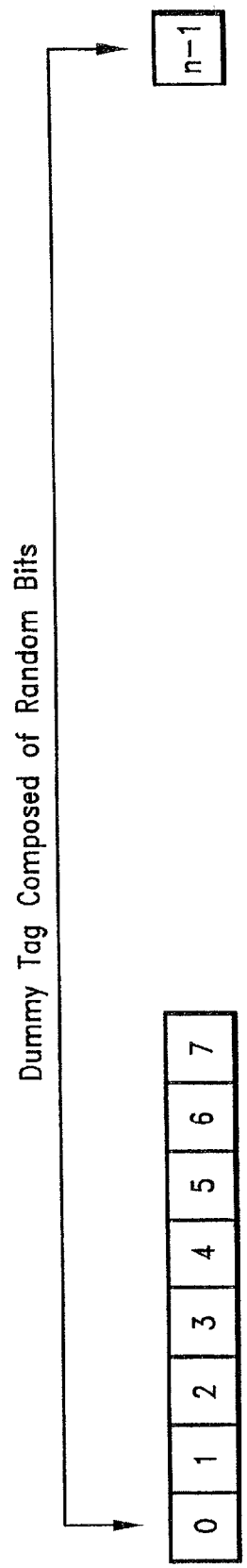

As discussed above, dummy identification tags may be utilized in some content to prevent hostile software from automatically removing advertising media objects. To promote the use of dummy identification tags, they are preferably constructed simply as a random sequence of n bits, as shown in FIG. 12*c*. In an alternate embodiment, the functionality for generating both real and dummy identification tags and encoding the identification tags into the media objects can be performed by third parties, such as advertising agencies or commercial producers, including edit houses or production facilities.

Figure 13:
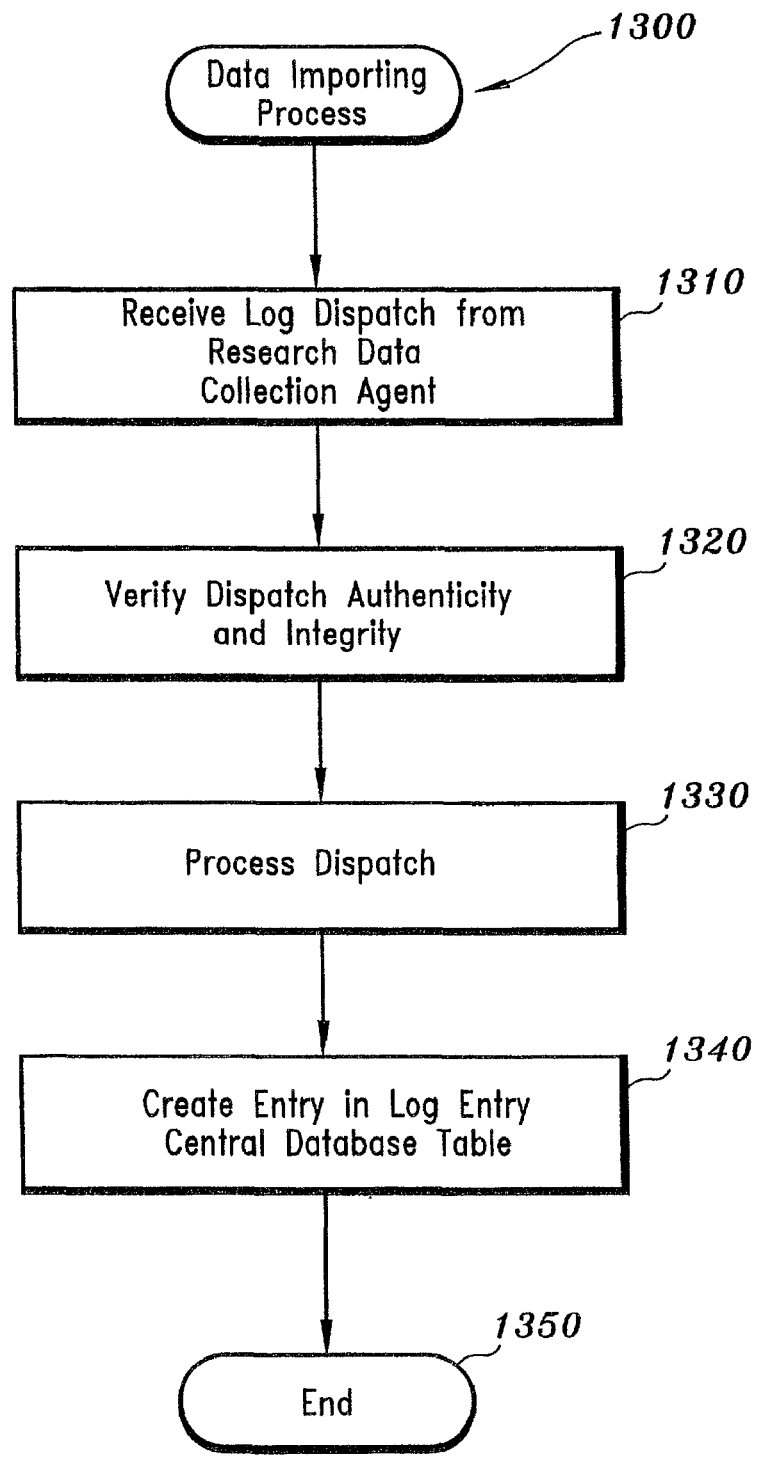
FIG. 13 is a flow chart describing a data importing process as implemented by the media research controller of FIG. 3.
Figure 14:
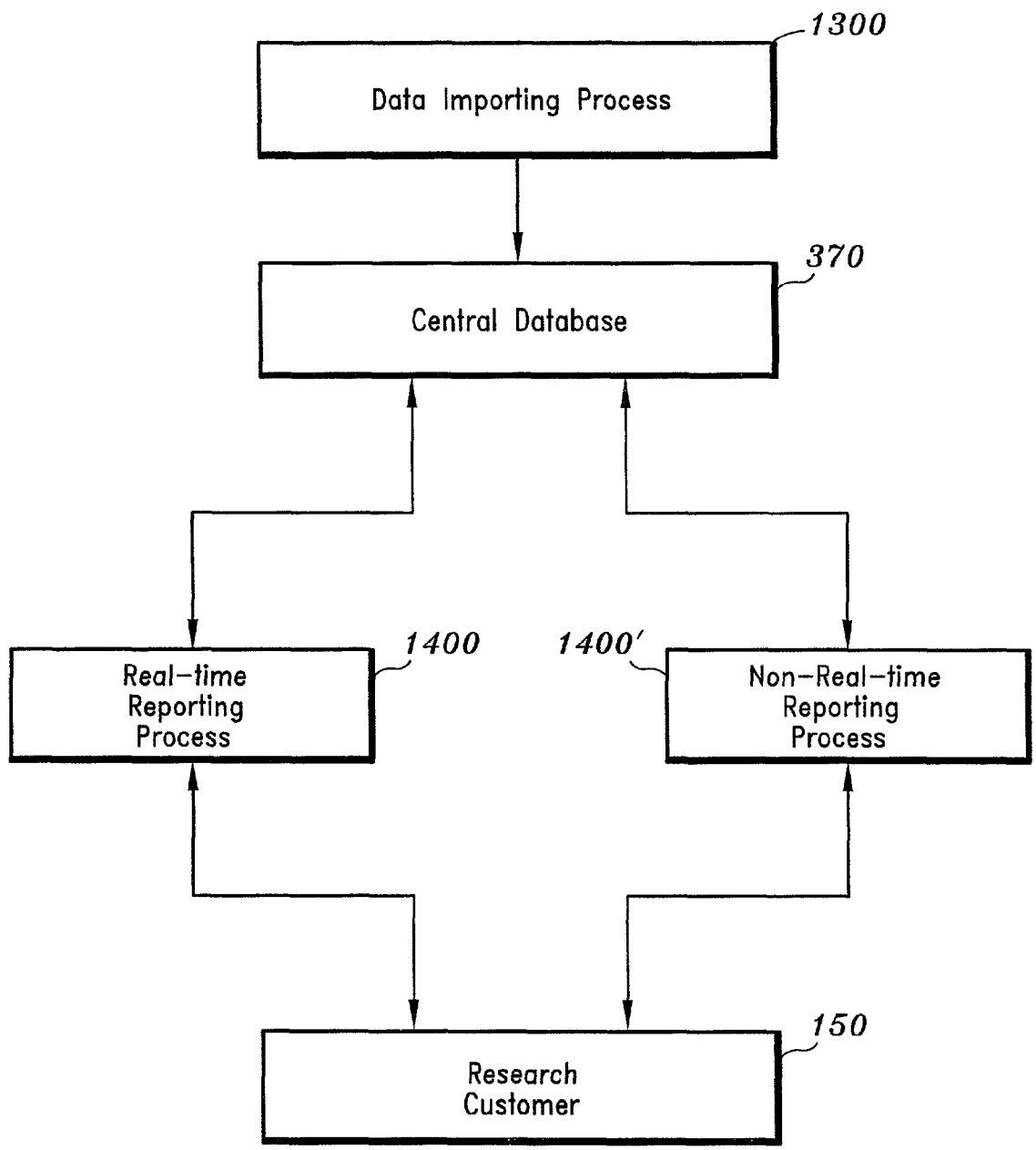
FIG. 14 is a flow chart illustrating a reporting process as implemented by the media research controller of FIG. 3.

As discussed above, the media research controller 300 preferably executes a data importing process 1300, shown in FIG. 13, to receive log dispatches from the remote media research agents 1500, verify the authenticity and integrity of the received messages and place confirmed entries in the log entry table 800. As illustrated in FIG. 13, the media research controller 300 executes the data importing process upon receipt of a log dispatch from a research data collection agent during step 1310.

Thereafter, the data importing process verifies the authenticity and integrity of the dispatch during step 1320 and then decrypts the dispatch during step 1330. Finally, the data importing process places all confirmed entries from the dispatch in the log entry database table 800 during step 1340 before program control terminates during step 1350.

As previously indicated, the media research controller 300 preferably executes a real-time reporting process 1400, or a non-real-time reporting process 1400', to generate reports suited to the needs of a particular research customer 150. As shown in FIG. 14, the data importing process 1300, discussed above, will create records of data received from the research data collection agents 1500 in a central database 370, from which the reports will be generated. The reports will be formatted to present available data, in a conventional manner, according to the needs one or more research customers 150. The customers 150 can access the reports over the external networks 130, or the reports can be printed off-line and provided to the customer 150, as would be apparent to a person of ordinary skill.

Research Data Collection Agent

Figure 15A:
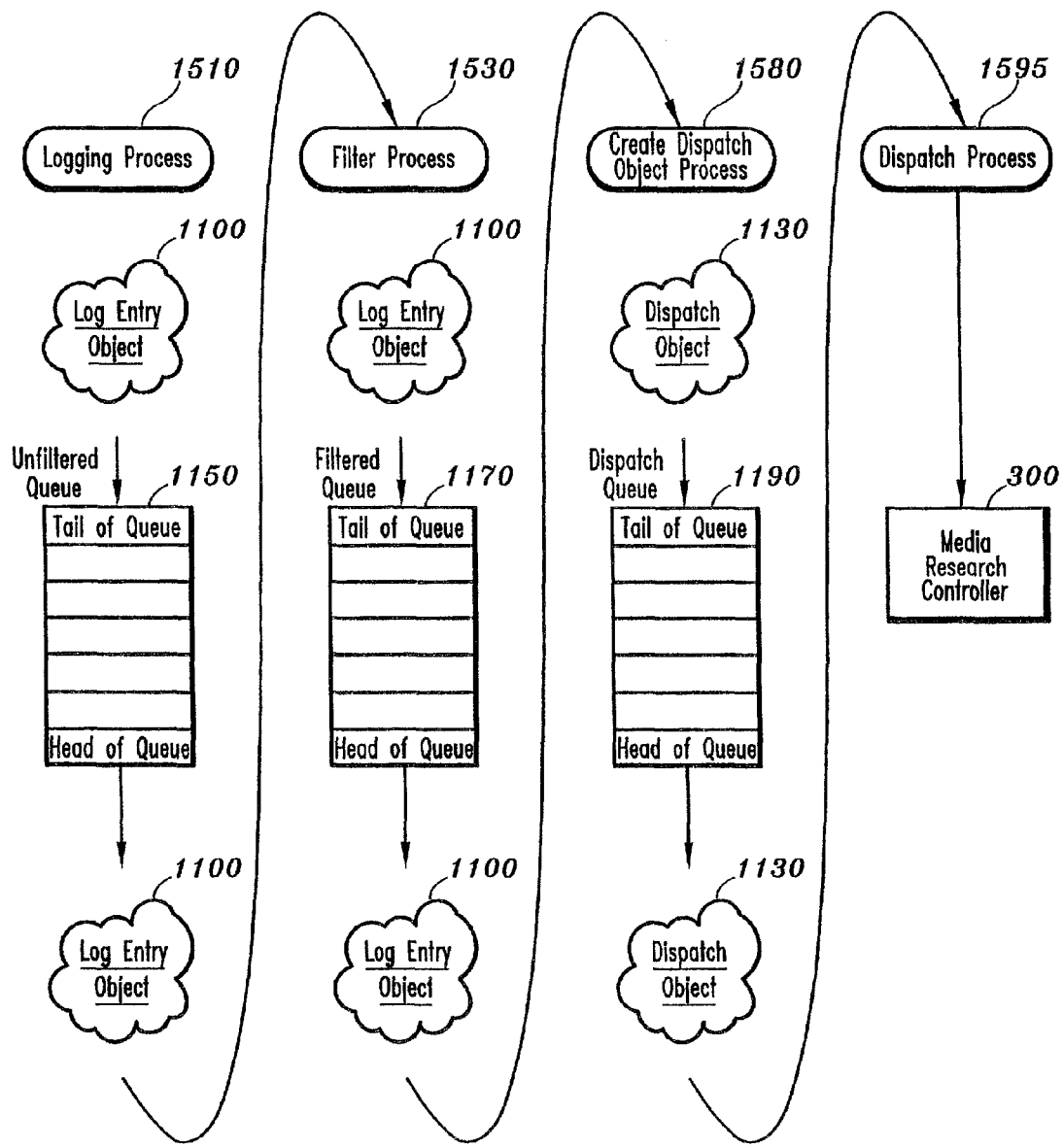
FIG. 15a provides an overview of the processes shown in FIGS. 15b through 15f on the media queues of FIG. 4.

As shown in FIG. 15*a*, the research data collection agent 1500 preferably includes a logging process 1510, a filter process 1530, a create-dispatch object process 1580 and a dispatch process 1595, discussed further below in conjunction with FIGS. 15*b*, 15*c*, 15*e* and 15*f*, respectively. The logging process 1510 is executed by the research data collection agent 1500 to receive messages from cooperative media handlers 1700 and create entry objects in an unfiltered media queue 1150. The filter process 1530 is executed to filter out dummy tags and other unnecessary information from the unfiltered media queue 1150 to create a filtered media queue 1170. Finally, the research data collection agent 1500 executes the create-dispatch object process 1580 to place the entries from the filtered media queue 1170 into a dispatch queue 1190 for transmission to the media research controller 300, by the dispatch process 1195 when resources are available. It is noted that the research data collection agent 1500 may also receive information regarding specific transactions made by an associated panel member, from a cooperative financial or end-user transaction process, as would be apparent to a person of ordinary skill, based on the disclosure herein.

Figure 15B:
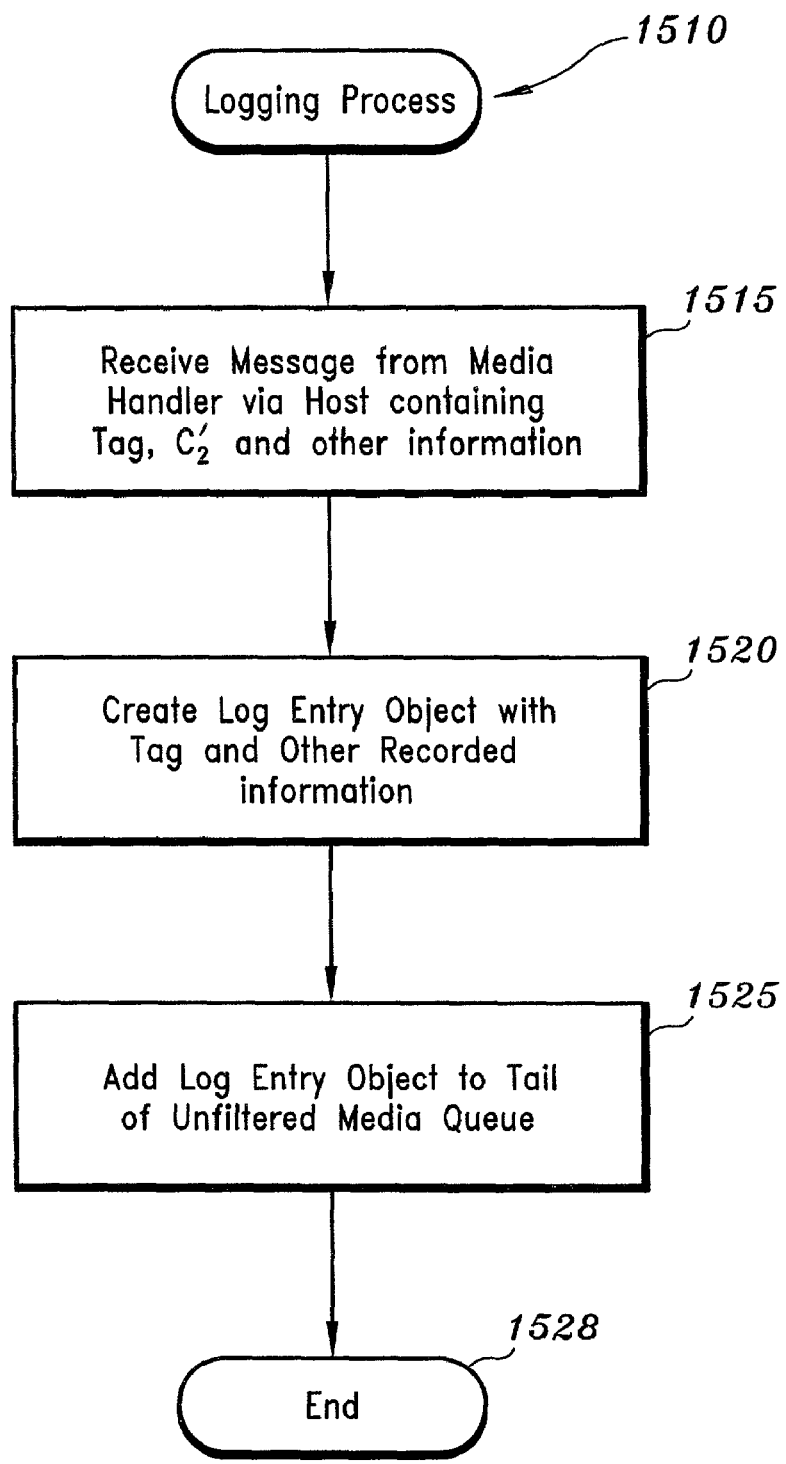
FIG. 15b is a flow chart describing a logging process as implemented by the research data collection agent of FIG. 4.

As previously indicated, the research data collection agent 1500 executes a logging process 1510, shown in FIG. 15*b*, to receive messages from the cooperative media handler 1700 and to create entries in the unfiltered media queue 1150. Thus, the logging process 1510 is entered during step 1515 upon receipt by the research data collection agent 1500 of a message from a cooperative media handler 1700 by means of the host 1600 of the media handler 1700, containing an extracted identification tag, $C_2'$, if available, and other information. Thereafter, the logging process 1510 creates a log entry object 1100 with the identification tag and other received information in the unfiltered media queue 1150 during step 1520, which is added to the tail of the unfiltered media queue 1150 during step 1525 before program control terminates during step 1528.

Figure 15C:
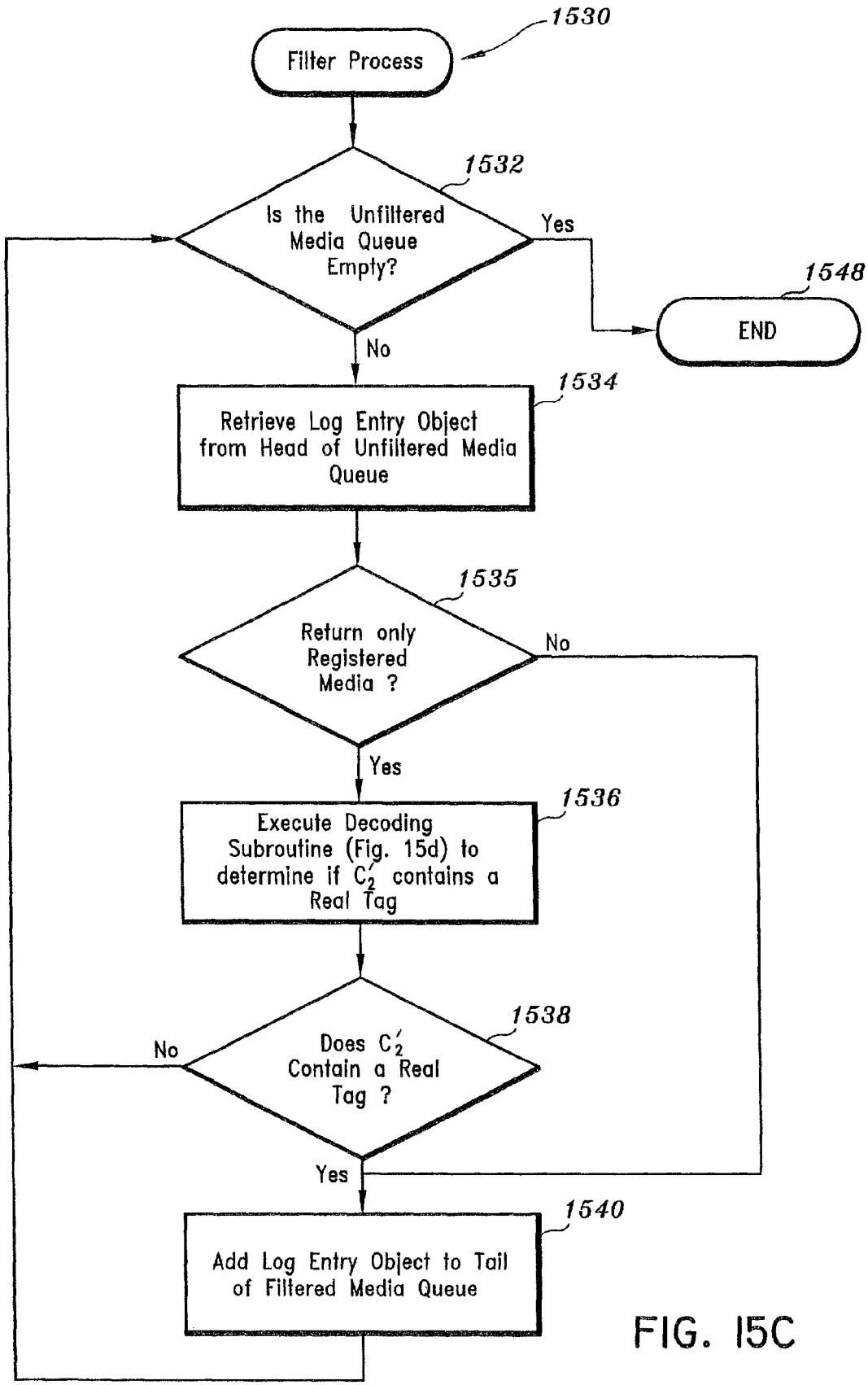
FIG. 15c is a flow chart describing a filter process as implemented by the research data collection agent of FIG. 4.

As discussed above, the research data collection agent 1500 periodically executes a filter process 1530, shown in FIG. 15*c*, to filter out dummy tags and other unnecessary information from the unfiltered media queue 1150 to create a filtered media queue 1170. As shown in FIG. 15*c*, the filter process 1530 performs a test during step 1532 to determine if the unfiltered media queue 1150 is empty. If it is determined during step 1532 that the unfiltered media queue 1150 is empty, then program control ends during step 1548. If, however, it is determined during step 1532 that the unfiltered media queue 1150 is not empty, then a log entry object 1100 is retrieved from the head of the unfiltered media queue 1150 during step 1534.

Thereafter, a test is performed during step 1535 to determine whether the media research controller 300 has instructed the research data collection agent 1500 to return information only about registered media. If it is determined during step 1535 that the media research controller 300 has not instructed the research data collection agent 1500 to return information only about registered media, then program control proceeds to step 1540. If, however, it is determined during step 1535 that the media research controller 300 has instructed the research data collection agent 1500 to return information only about registered media, then a decoding subroutine 1550, discussed below in conjunction with FIG. 15*d*, is executed during step 1536 to determine if the received tag, $C_2'$, stored in the current entry object 1100 of the unfiltered media queue 1150, contains a real identification tag, which is generally associated with registered media.

After the subroutine 1550 executes, a test is performed during step 1538 to determine if the received tag, $C_2'$, stored in the current log entry object 1100, contains a real identification tag. If it is determined during step 1538 that the received tag, $C_2'$, stored in the current log entry object 1100, does not contain a real identification tag, then program control returns directly to step 1532 to process additional log entry objects 1100, if any. If, however, it is determined during step 1538 that the received tag, $C_2'$, stored in the log entry object 1100, does contain a real identification tag, then the current log entry object 1100 is placed in the filtered media queue 1170 during step 1540. Thereafter, program control returns to step 1532 to process additional log entry objects 1100, if any, in the manner described above.

In this manner, for efficiency purposes, if the research data collection agent 1500 is tasked by the media research controller to report only registered media, then the research data collection agent 1500 preferably only returns log entry objects 1100 containing real identification tags to the media research controller 300. The research data collection agent 1500 preferably does not know, however, whether or not the media object containing a real identification tag is an advertisement. As previously indicated, real identification tags are preferably placed in a small percentage of the advertising-subsidized media objects as a countermeasure against hostile advertising filtering software. Thus, if the research data collection agent's local encryption keys $K_2$ and $K_3$ are compromised and obtained by advertising filtering software, the advertising filtering software erroneously filters out some non-advertising media objects. It is noted that advertising filtering software is further discouraged by the preferred selection of challenging encryption techniques, since the research data collection agent 1500 can evaluate the authenticity of a received tag hours after the media is presented, while the advertising filtering software typically would need to decrypt the identification tags in real-time.

Figure 15D:
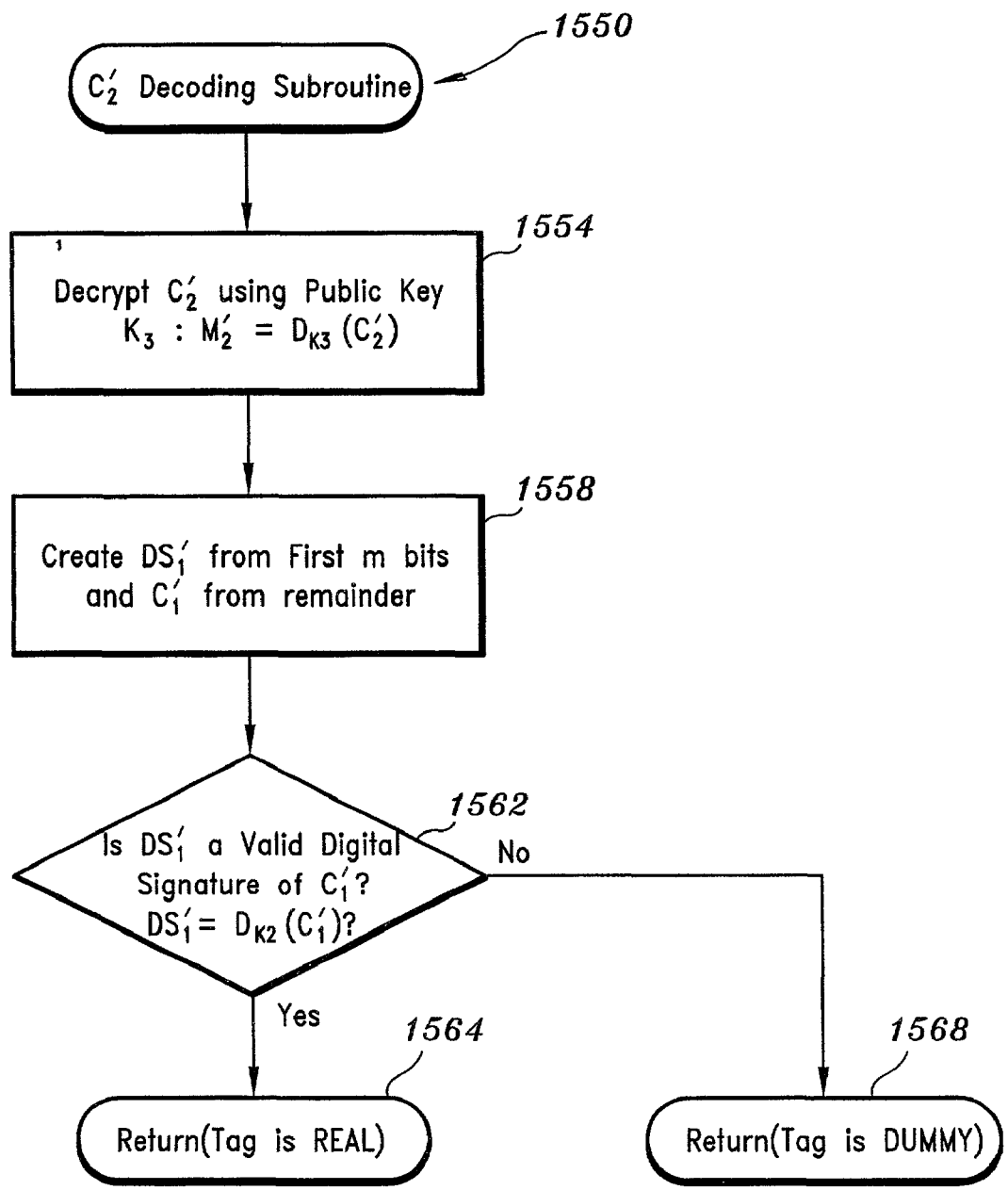
FIG. 15d is a flow chart describing a tag decoding subroutine as implemented by the research data collection agent of FIG. 4.

As previously indicated, the filter process 1530 executes a decoding subroutine 1550, shown in FIG. 15*d*, during step 1536 to determine if the received tag, $C_2'$, stored in the current record of the unfiltered media log 1100, contains a real identification tag. The decoding subroutine 1550 is entered during step 1554, where the received tag, $C_2'$, is decrypted to create a message, $M_2'$, using the value of the public key, $K_3$, stored in the local encryption keys database table 1000. The decoding subroutine 1550 then creates a digital signature, $DS_1'$, from the first m bits of the message, $M_2'$, and creates $C_1'$ from the remainder during step 1558.

Thereafter, a test is performed during step 1562 to determine if the digital signature, $DS_1'$, is a valid digital signature of $C_1'$. If it is determined during step 1562 that the digital signature, $DS_1'$, is a valid digital signature of $C_1'$ then the decoding subroutine returns an indication during step 1564 to the filter process 1530 that the received tag is a real identification tag. If, however, it is determined during step 1562 that the digital signature, $DS_1'$, is not a valid digital signature of $C_1'$ then the decoding subroutine returns an indication during step 1568 to the filter process 1530 that the received tag is an invalid or dummy identification tag. In order to implement the security algorithms discussed in FIG. 15d, the research data collection agent 1500 preferably has access to the necessary cryptographic services through its host, and has received the required public keys, $K_2$ and $K_3$, by means of a secure distribution method from the media research controller 300.

Figure 15E:
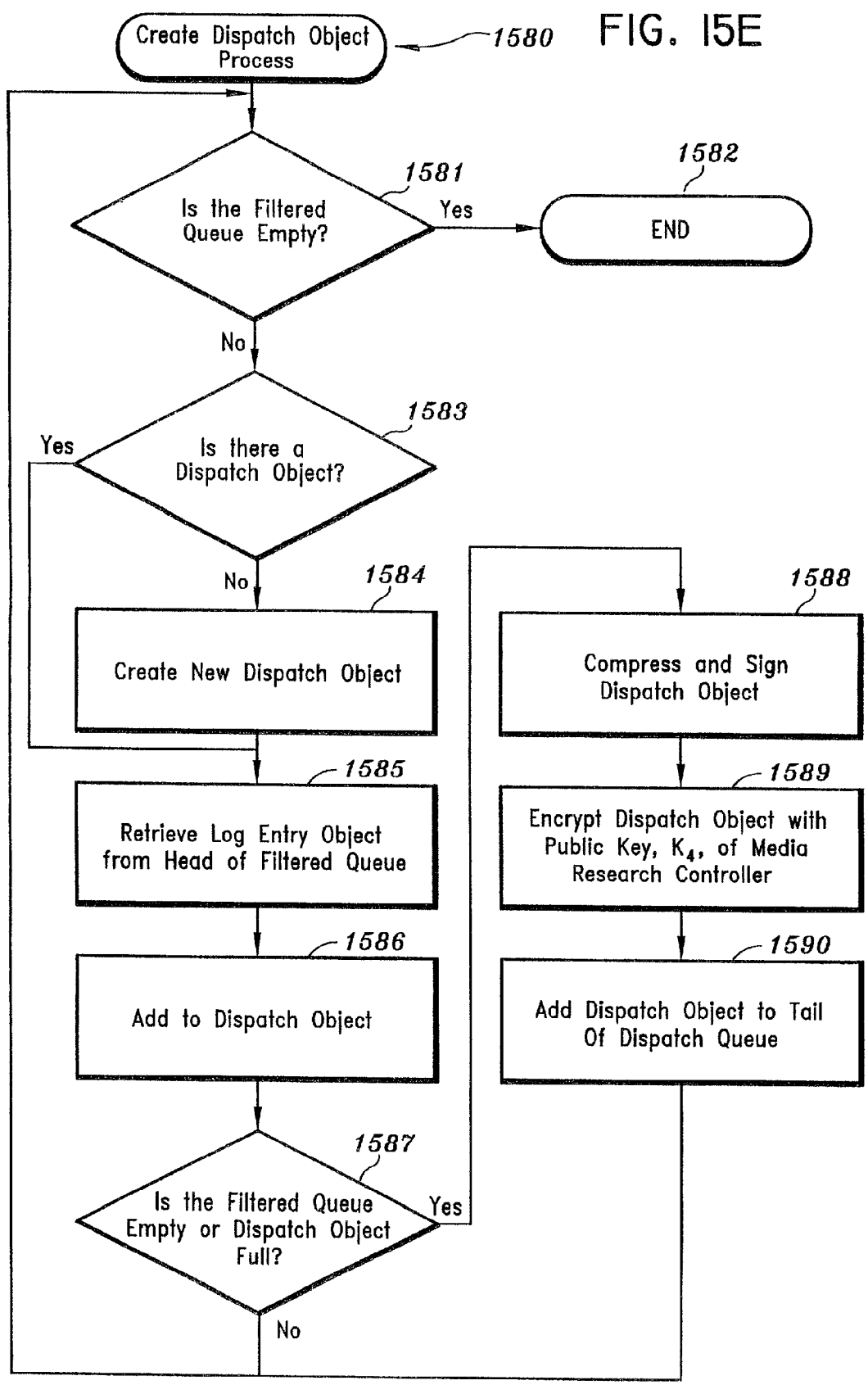
FIG. 15e is a flow chart describing a create-dispatch object process as implemented by the research data collection agent of FIG. 4.
Figure 15F:
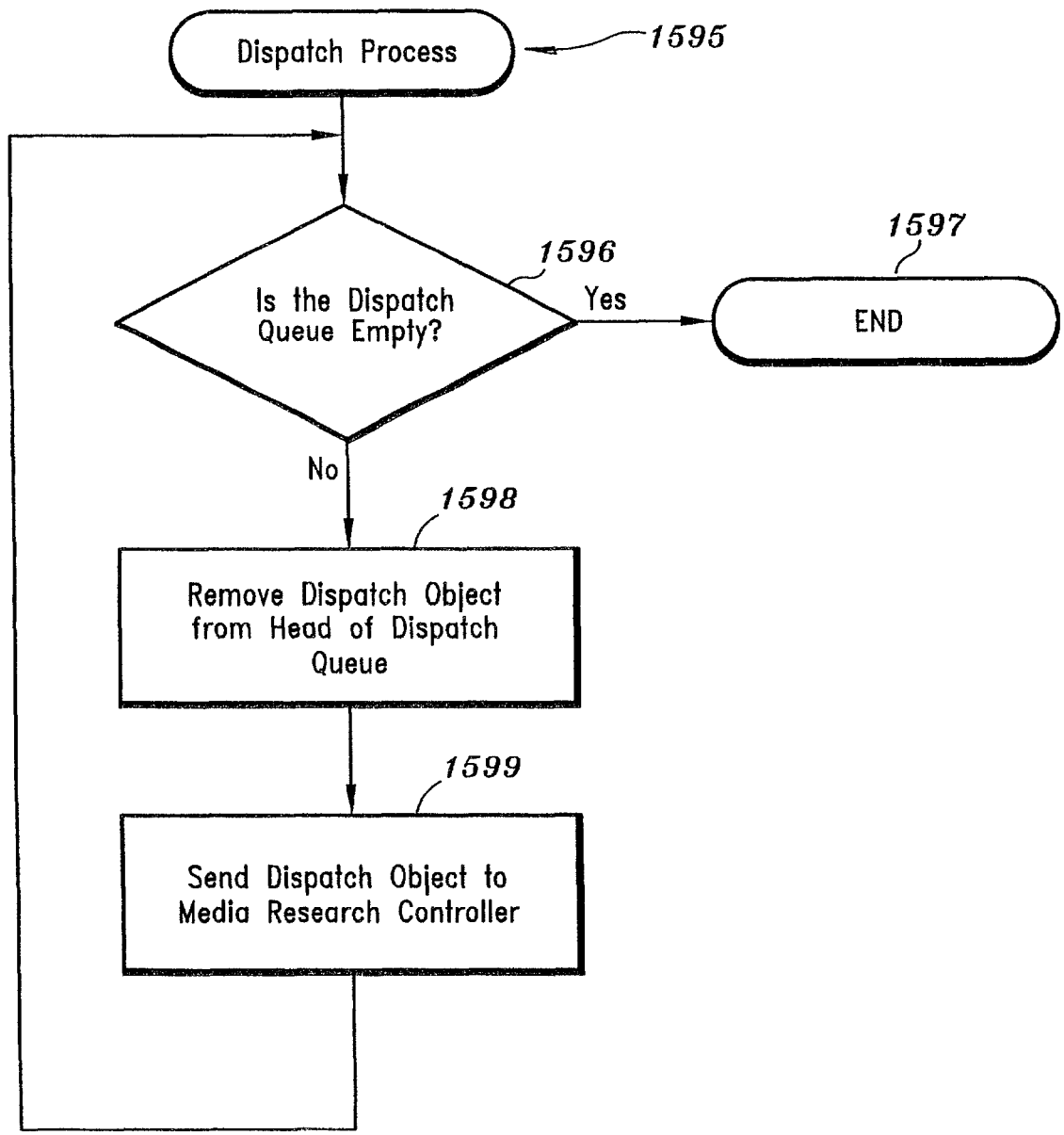
FIG. 15f is a flow chart describing a dispatch process as implemented by the research data collection agent of FIG. 4.

As discussed above, the research data collection agent 1500 executes a create-dispatch object process 1580, shown in FIG. 15e, to place entries from the filtered media queue 1170 into a dispatch queue 1190 for transmission by the dispatch process 1190, shown in FIG. 15f, to the media research controller 300, when resources are available. Initially, the create-dispatch object process 1580 performs a test during step 1581 to determine if the filtered media queue 1170 is empty. If it is determined during step 1581 that the filtered media queue 1170 is empty, then program control ends during step 1582.

If, however, it is determined during step 1581 that the filtered media queue 1170 is not empty, then a further test is performed during step 1583 to determine if a dispatch object 1130 already exists. If it is determined during step 1583 that a dispatch object 1130 already exists, then program control proceeds directly to step 1585. If, however, it is determined during step 1583 that a dispatch object 1130 does not already exist, then a new dispatch object 1130 is created during step 1584.

Thereafter, a log entry object 1100 is retrieved from the head of the filtered media queue 1150 during step 1585, and placed in the dispatch object 1130. Thereafter, a test is performed during step 1587 to determine if the filtered media queue 1170 is empty or if the dispatch object 1130 is full. If it is determined during step 1585 that the filtered media queue 1170 is not empty and that the dispatch object 1130 is not full, then program control returns to step 1581 to continue processing additional log entry objects 1100 from the filtered media queue 1170, if any.

If, however, it is determined during step 1585 that the filtered media queue 1170 is empty or that the dispatch object 1130 is full, then the dispatch object 1130 will be compressed and digitally signed during step 1588. Thereafter, the compressed dispatch object 1130 will preferably be encrypted during step 1589 using the public key, $K_4$, of the media research controller 300. Finally, the compressed and encrypted dispatch object 1130 will be added to the tail of the dispatch queue 1190 during step 1590 and program control returns to step 1581 and continues in the manner discussed above.

As previously indicated, a dispatch process 1595, shown in FIG. 15f, transmits dispatch objects 1130 from the dispatch queue 1190 to the media research controller 300, when resources are available. Thus, a test is initially performed during step 1596 to determine if the dispatch queue 1190 is empty. If it is determined during step 1596 that the dispatch queue 1190 is empty, then program control terminates during step 1597. If, however, it is determined during step 1596 that the dispatch queue 1190 is not empty, then a dispatch object 1130 is removed from the head of the dispatch queue 1190 during step 1598 and sent to the media research controller 300 during step 1599. Thereafter, program control returns to step 1596 to process additional dispatch objects 1130, if any, in the manner described above.

Host Process(es)

Figure 16:
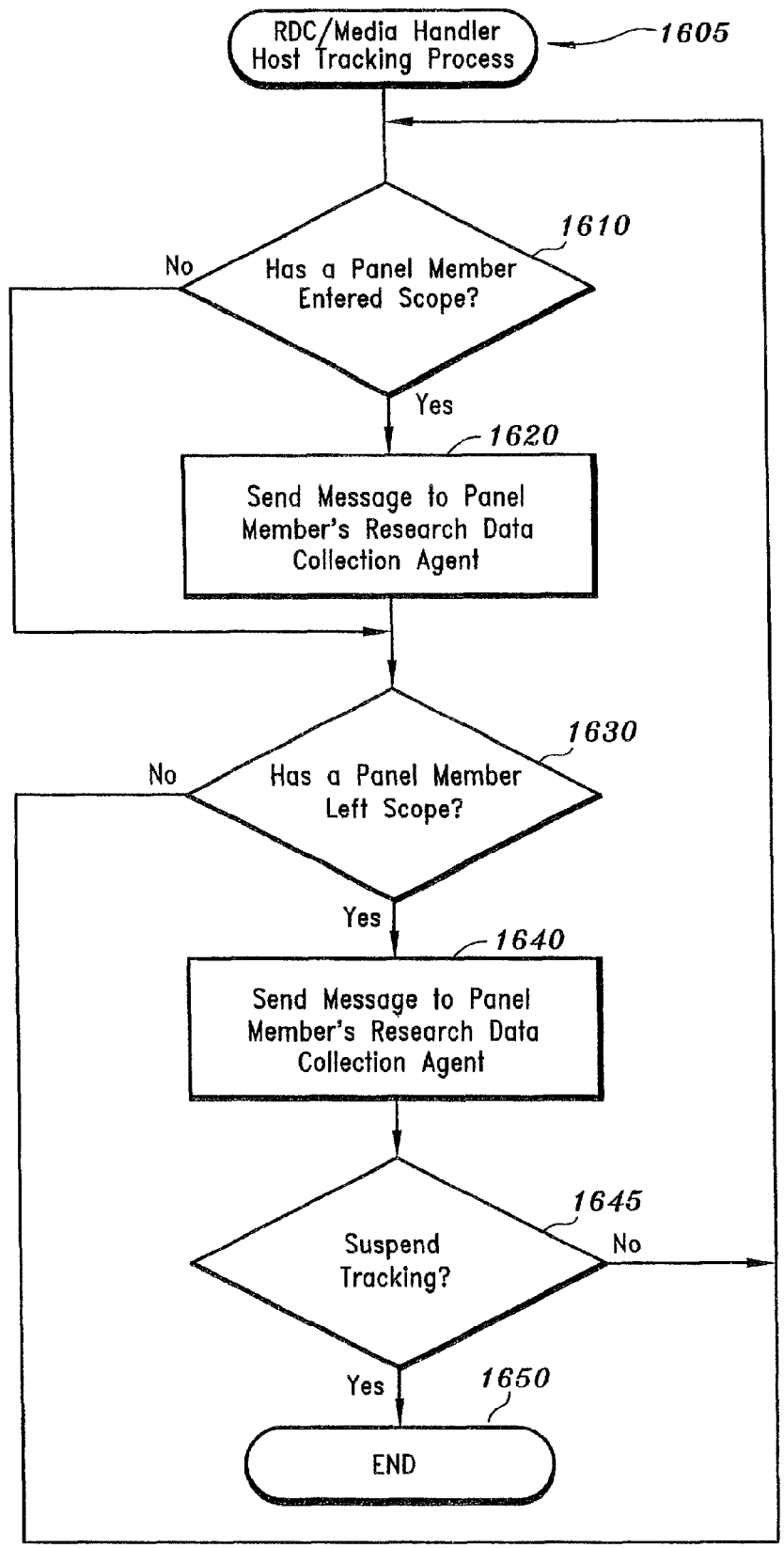
FIG. 16 is a flow chart describing a suitable host tracking process as implemented by the panel member-computing device of FIG. 4.

As previously indicated, the RDC/cooperative media handler host 1600 preferably executes a tracking process 1605, shown in FIG. 16, to notify the hosted research data collection agents 1500 when a panel member enters or exits the agent's scope. In addition, as discussed above, the research data collection agents 1500 and the cooperative media handlers 1700 preferably rely on services and resources provided by the host processes for processing, security, storage and communication. In the illustrative embodiment discussed herein, an Internet browser software product, such as Netscape Navigator™ or Microsoft Internet Explorer™, resident on the panel member-computing device 400, serves as the host for both the research data collection agent 1500 and the cooperative media handler 1700 and provides them with computational resources.

Thus, as shown in FIG. 16, an illustrative tracking process 1605 continuously reports when a panel member enters or exits its scope during step 1610. Once the tracking process 1605 determines that a panel member has entered the scope of a research data collection agent, a message is sent to the hosted research data collection agent 1500 during step 1620 monitoring the panel member indicating that a panel member has entered the agent's scope.

Thereafter, the tracking process 1605 continuously monitors the panel member during step 1630 until the panel member leaves the scope of the hosted research data collection agent 1500. If it is determined during step 1630 that the panelist has left the scope of the hosted research data collection agent 1500, then a message is sent to the hosted research data collection agent 1500 during step 1640 indicating that a panel member has left the agent's scope. A test is then performed during step 1645 to determine if tracking should be suspended. If it is determined during step 1645 that tracking should not be suspended, then program control returns to step 1610 to continue tracking, in the manner described above. If, however, it is determined during step 1645 that tracking should be suspended, then program control terminates during step 1650.

Cooperative Media Handlers

As discussed above, the cooperative media handler process 1700, shown in FIG. 17, preferably presents media objects and extracts information from, or otherwise obtains information about, presented media objects, including identification tags, if present, for collection by research data collection agents 1500, whether or not a research data collection agent 1500 is actually present. In an alternate implementation, the cooperative media handler 1700 can transmit all information obtained about a media object directly to the media research controller 300 and perform all other tasks associated with the research data collection agents 1500. In other words, the cooperative media handler 1700 can directly serve as the software agent of the media research controller 300, without the need of an intermediary research data collection agent 1500, as would be apparent to a person of ordinary skill.

In one embodiment, the media handler 1700 is provided with one or more remotely configurable settings which may be dynamically specified by the research data collection agent 1500 or the media research controller 300 to help filter out information which is not of interest to the research data collection agent 1500. Alternatively, the media handler 1700 can query its host to identify the information of interest to the research data collection agent 1500. If, however, the host does not want to inform the media handler 1700 that no research data collection agent 1500 is present, the host might have the media handler 1700 pass everything. Thus, the media handler 1700 preferably reports information according to instructions received from the research data collection agent 1500 via its host.

As shown in FIG. 17, a cooperative media handler 1700 is initiated by its host 1600', such as the illustrative Internet browser, upon receipt of a media object having a media type that is compatible with the media handler. Thereafter, the media handler process 1700 decodes and parses the media object during step 1705, in a known manner. A test is then performed during step 1710 to determine if there is media object information associated with the media object, such as an identification tag, metadata or contextual information. As previously indicated, metadata may include program identification information and the corresponding media type and contextual information may include the URL and other information indicating the source of the corresponding media object, or the context in which it was presented to the end user. If it is determined during step 1710 that there is media object information associated with the media object, then a test is performed during step 1785 to determine if a message has already been created for the research data collection agent 1500. If it is determined during step 1785 that a message has already been created for the research data collection agent 1500, then program control proceeds directly to step 1795. If, however, it is determined during step 1785 that a message has not yet been created for the research data collection agent 1500, then a message is created during step 1790.

Thereafter, the media object information identified during step 1710 is added to the agent message during step 1795. Thereafter, a further test is performed during step 1720 to determine if there is media to present to a user. If it is determined during step 1720 that there is no media to present to a user, then program control proceeds directly to step 1740. If, however, it is determined during step 1720 that there is media to present to a user, then a conventional presentation process is performed during step 1725 to present the media. A test is then performed during step 1730 to determine if there is presentation information to report to the research data collection agent 1500. As previously indicated, presentation information may include the language and format in which the media object was presented to the panel member, or other information indicating how the object was presented to the panel member, when alternative presentations are possible. If it is determined during step 1730 that there is no presentation information to report to the research data collection agent 1500, then program control proceeds directly to step 1760. If, however, it is determined during step 1730 that there is presentation information to report to the research data collection agent 1500, then the presentation information identified during step 1730 is added to the message during step 1735.

A test is performed during step 1740 to determine if user interactions are received during the presentation of the media object. If it is determined during step 1740 that user interactions are received during the presentation of the media object, then program control proceeds directly to step 1760. If, however, it is determined during step 1740 that user interactions are received during the presentation of the media object, then the user interactions are received and processed during step 1745. A test is then performed during step 1750 to determine if there is user interaction information to report to the research data collection agent 1500. As previously indicated, user interaction information may specify how the panel member interacted with the object, including whether the panel member zoomed in on portions of the media object, or rotated the object, as well as the size of the media object and any user inputs.

If it is determined during step 1750 that there is no user interaction information to report to the research data collection agent 1500, then program control proceeds directly to step 1760. If, however, it is determined during step 1750 that there is user interaction information to report to the research data collection agent 1500, then the user interaction information identified during step 1750 is added to the message during step 1755.

A test is performed during step 1760 to determine if the presentation of the media object is finished. If it is determined during step 1760 that the presentation of the media object is not finished, then program control will return to step 1705 to continue processing in the manner described above. If, however, it is determined during step 1760 that the presentation of the media object is finished, then a test is performed during step 1765 to determine if there is a message to be sent to the research data collection agent 1500. If it is determined during step 1765 that there is a message to be sent to the research data collection agent 1500, then the message is completed during step 1770, for example, by adding media handler identifying information, and a final time and date stamp. Thereafter, the completed message is sent to the research data collection agent 1500. Program control will then terminate during step 1780.

It is to be understood that the embodiments and variations shown and described herein are merely illustrative of the principles of this invention and that various modifications may be implemented by those skilled in the art without departing from the scope and spirit of the invention.

I claim:

1. A method performed by a software agent of a first entity measuring the exposure of an individual to electronic media, said method comprising:

using a processor to obtain information identifying said electronic media from a cooperative media handler provided by a second entity using a defined interface that provides interoperability between said software agent and said cooperative media handler, wherein the software agent identifies, from the information identifying the electronic media, media research information of interest and dynamically selects a media research task to be performed by the cooperative media handler to obtain only the identified media research information of interest, where the media research task is associated with the handling of electronic media by the cooperative media handler; and using a processor to provide at least a portion of the identified media research information of interest to said first entity measuring the exposure of said individual to said electronic media.

2. The method according to claim 1, wherein said individual is chosen for the individual's demographics and has agreed to participate in a research panel to have the individual's exposure to and interactions with said electronic media measured.

3. The method of claim 1, wherein said individual is part of an audience.

4. The method of claim 1, wherein said individual is part of a research panel chosen as a sample to statistically represent a larger population.

5. The method of claim 1, further comprising identifying and authenticating said individual.

6. The method according to claim 1, wherein said information identifying said electronic media further comprises information identifying said individual.

7. The method according to claim 1, wherein said information identifying said electronic media includes an identification tag.

8. The method according to claim 1, wherein said information identifying said electronic media includes metadata.

9. The method according to claim 1, wherein said information identifying said electronic media includes presentation information.

10. The method according to claim 1, wherein said information identifying said electronic media includes contextual information made available to the cooperative media handler by its host.

11. The method according to claim 1, wherein said information identifying said electronic media provided by said cooperative media handler includes information about the interactions of said individual with said electronic media.

12. The method of claim 1, wherein said information identifying said electronic media includes an identifier of said cooperative media handler.

13. The method of claim 1, wherein said information identifying said electronic media includes an identifier of a host of said cooperative media handler.

14. The method of claim 1, wherein said cooperative media handler decodes and presents said electronic media obtained from a wired network connection.

15. The method of claim 1, wherein said cooperative media handler decodes and presents said electronic media obtained from a wireless network connection.

16. The method of claim 1, wherein said cooperative media handler presents said electronic media generated in real-time.

17. The method of claim 1, wherein said cooperative media handler is a software component that temporarily extends the capabilities of its host to present media.

18. The method of claim 1, wherein said cooperative media handler is a persistent software component that extends the capabilities of a software application to present media objects of a particular media type to an individual.

19. The method of claim 1, wherein said cooperative media handler is a persistent software component that extends the capabilities of an operating system to present media objects of a particular media type to an individual.

20. The method of claim 1, wherein said cooperative media handler is mobile.

21. The method of claim 1, wherein said cooperative media handler is stable.

22. The method of claim 1, wherein said cooperative media handler decodes and presents said electronic media, obtains information about said electronic media, and makes said information about said electronic media available for collection by said software agent by means of said cooperative media handler's host.

23. The method according to claim 1, wherein said cooperative media handler may be remotely configured to specify which portions of said information identifying said electronic media to obtain and provide to said software agent.

24. The method of claim 1, wherein said cooperative media handler decodes and presents said electronic media obtained from a local storage device.

25. The method of claim 1, wherein said cooperative media handler decodes and presents pre-recorded electronic media.

26. The method of claim 1, wherein said cooperative media handler generates media experiences in real-time.

27. The method of claim 1, wherein said cooperative media handler is hosted within a device selected from the group consisting of: an Internet-enabled device, a set-top box, a television, a telephone, a pager and a personal digital assistant.

28. The method of claim 1, wherein said software agent is not proximal to the physical environment of said individual.

29. The method of claim 1, wherein said software agent is hosted within a smartcard associated with said individual.

30. The method of claim 1, wherein said software agent is hosted by an online service.

31. The method of claim 1, wherein said software agent and said cooperative media handler are hosted separately.

32. The method of claim 1, wherein said software agent logs said information identifying said electronic media.

33. The method according to claim 1, wherein said software agent filters said information identifying said electronic media, such that only a portion of said information identifying said electronic media is provided to said first entity.

34. The method according to claim 1, further comprising providing a software agent for each computing device utilized by a given panel member.

35. The method of claim 1, wherein said software agent obtains said information identifying said electronic media by receiving a communication from said cooperative media handler.

36. The method of claim 1, wherein said software agent obtains said information identifying said electronic media by retrieving said information identifying said electronic media made available by said cooperative media handler.

37. The method of claim 1, wherein said defined interface includes an application programming interface (API).

38. The method of claim 1, wherein said defined interface includes a communication protocol.

39. The method of claim 1, wherein said defined interface includes a secure communication protocol.

40. The method of claim 1, wherein said defined interface includes an interface between said software agent and its host.

41. The method of claim 1, wherein said defined interface includes an application programming interface (API) between said software agent and its host.

42. The method of claim 1, wherein said defined interface includes a communication protocol between a host of said software agent and a host of said cooperative media handler.

43. The method of claim 1, wherein said defined interface includes an interface between said cooperative media handler and its host.

44. The method of claim 1, wherein said defined interface includes an application programming interface (API) between said cooperative media handler and its host.

45. The method of claim 1, wherein said electronic media is part of a video game.

46. The method of claim 1, wherein said electronic media includes an electronic media object.

47. The method of claim 1, wherein said electronic media is a software component.

48. The method of claim 1, wherein said electronic media is presented using an Internet-enabled device.

49. A method for measuring the exposure of an individual to electronic media, said method comprising:

tracking said individual with at least one software agent, said software agent using a processor to obtain presentation information from a cooperative media handler by means of a defined interface that provides interoperability between said software agent and said cooperative media handler, wherein the software agent classifies the presentation information as either media research information of interest or media research information not of interest and dynamically selects a media research task to be performed by the cooperative media handler, where the media research task is associated with the handling of electronic media by the cooperative media handler, wherein the cooperative media handler presents electronic media to said individual and gathers only the media research information of interest related to the media presentation and provides the media research information of interest to said software agent by means of said defined interface; and receiving at least a portion of the media research information of interest from said software agent.

50. The method according to claim 49, wherein said individual is chosen for the individual's demographics and has agreed to participate in a research panel to have the individual's exposure to and interactions with said electronic media measured.

51. The method of claim 49, wherein said individual is part of an audience.

52. The method of claim 49, wherein said individual is part of a research panel chosen as a sample to statistically represent a larger population.

53. The method of claim 49, further comprising identifying and authenticating said individual.

54. The method according to claim 49, wherein said information identifying said electronic media further comprises information identifying said individual.

55. The method according to claim 49, wherein said information identifying said electronic media includes an identification tag.

56. The method according to claim 49, wherein said information identifying said electronic media includes metadata.

57. The method according to claim 49, wherein said information identifying said electronic media includes presentation information.

58. The method according to claim 49, wherein said information identifying said electronic media includes contextual information made available to the cooperative media handler by its host.

59. The method according to claim 49, wherein said information identifying said electronic media provided by said cooperative media handler includes information about the interactions of said individual with said electronic media.

60. The method of claim 49, wherein said information identifying said electronic media includes an identifier of said cooperative media handler.

61. The method of claim 49, wherein said information identifying said electronic media includes an identifier of a host of said cooperative media handler.

62. The method of claim 49, wherein said cooperative media handler decodes and presents said electronic media obtained from a wired network connection.

63. The method of claim 49, wherein said cooperative media handler decodes and presents said electronic media obtained from a wireless network connection.

64. The method of claim 49, wherein said cooperative media handler presents said electronic media generated in real-time.

65. The method of claim 49, wherein said cooperative media handler is a software component that temporarily extends the capabilities of its host to present media.

66. The method of claim 49, wherein said cooperative media handler is a persistent software component that extends the capabilities of a software application to present media objects of a particular media type to an individual.

67. The method of claim 49, wherein said cooperative media handler is a persistent software component that extends the capabilities of an operating system to present media objects of a particular media type to an individual.

68. The method of claim 49, wherein said cooperative media handler is mobile.

69. The method of claim 49, wherein said cooperative media handler is stable.

70. The method of claim 49, wherein said cooperative media handler decodes and presents said electronic media, obtains information about said electronic media, and makes said information about said electronic media available for collection by said software agent, by means of said cooperative media handler's host.

71. The method according to claim 49, wherein said cooperative media handler may be remotely configured to specify which portions of said information identifying said electronic media to obtain and provide to said software agent.

72. The method of claim 49, wherein said cooperative media handler decodes and presents said electronic media obtained from a local storage device.

73. The method of claim 49, wherein said cooperative media handler decodes and presents pre-recorded electronic media.

74. The method of claim 49, wherein said cooperative media handler generates media experiences in real-time.

75. The method of claim 49, wherein said cooperative media handler is hosted within a device selected from the group consisting of: an Internet-enabled device, a set-top box, a television, a telephone, a pager and a personal digital assistant.

76. The method of claim 49, wherein said software agent is not proximal to the physical environment of said individual.

77. The method of claim 49, wherein said software agent is hosted within a smartcard associated with said individual.

78. The method of claim 49, wherein said software agent is hosted by an online service.

79. The method of claim 49, wherein said software agent and said cooperative media handler are hosted separately.

80. The method of claim 49, wherein said software agent logs said information identifying said electronic media.

81. The method according to claim 49, wherein said software agent filters said information identifying said electronic media, such that only a portion of said information identifying said electronic media is provided to said first entity.

82. The method according to claim 49, further comprising the step of providing a software agent for each computing device utilized by a given panel member.

83. The method of claim 49, wherein said software agent obtains said information identifying said electronic media by receiving a communication from said cooperative media handler.

84. The method of claim 49, wherein said software agent obtains said information identifying said electronic media by retrieving said information identifying said electronic media made available by said cooperative media handler.

85. The method of claim 49, wherein said defined interface includes an application programming interface (API).

86. The method of claim 49, wherein said defined interface includes a communication protocol.

87. The method of claim 49, wherein said defined interface includes a secure communication protocol.

88. The method of claim 49, wherein said defined interface includes an interface between said software agent and its host.

89. The method of claim 49, wherein said defined interface includes an application programming interface (API) between said software agent and its host.

90. The method of claim 49, wherein said defined interface includes a communication protocol between a host of said software agent and a host of said cooperative media handler.

91. The method of claim 49, wherein said defined interface includes an interface between said cooperative media handler and its host.

92. The method of claim 49, wherein said defined interface includes an application programming interface (API) between said cooperative media handler and its host.

93. The method of claim 49, wherein said electronic media is part of a video game.

94. The method of claim 49, wherein said electronic media includes an electronic media object.

95. The method of claim 49, wherein said electronic media is a software component.

96. The method of claim 49, wherein said electronic media is presented using an Internet-enabled device.

97. A method performed by a software process performing data collection tasks on behalf of a first entity measuring the exposure of an individual to electronic media, said method comprising:

using a processor to obtain information identifying said electronic media from a cooperative media handler provided by a second entity using a defined interface that provides interoperability between said software process and said cooperative media handler, wherein the media handler queries the software process to identify which of the information identifying the electronic media is of interest and which of the information identifying the electronic media is not of interest, and wherein the software process dynamically selects a media research task to be performed by the cooperative media handler to obtain the identified information of interest, where the media research task is associated with the handling of electronic media by the cooperative media handler; and using a processor to provide at least a portion of the identified information of interest to said first entity measuring the exposure of said individual to said electronic media.

98. A method for measuring the exposure of an individual to electronic media, said method comprising:

tracking said individual with at least one software process performing data collection tasks, said software process using a processor to obtain presentation information from a cooperative media handler by means of a defined interface that provides interoperability between said software process and said cooperative media handler, wherein the software process dynamically selects a media research task to be performed by the cooperative media handler, where the media research task is associated with the handling of electronic media by the cooperative media handler, wherein the cooperative media handler queries the software process to identify presentation information of interest, wherein the cooperative media handler presents electronic media to said individual and gathers presentation information about said media presentations and provides to said software process by means of said defined interface only the presentation information of interest when the software process responds to the query and identifies the presentation information of interest or all of the gathered presentation information where the software process does not respond to the query; and receiving at least a portion of said presentation information from said software process.

\* \* \* \* \*